United States Patent
Stagmer

(10) Patent No.: US 9,475,592 B2
(45) Date of Patent: Oct. 25, 2016

(54) REACTION SPHERE FOR STABILIZATION AND CONTROL IN THREE AXES

(71) Applicant: Northrop Grumman Systems Corporation, Falls Church, VA (US)

(72) Inventor: Emory Stagmer, Lutherville, MD (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 624 days.

(21) Appl. No.: 14/170,104

(22) Filed: Jan. 31, 2014

(65) Prior Publication Data

US 2014/0209751 A1    Jul. 31, 2014

Related U.S. Application Data

(60) Provisional application No. 61/759,033, filed on Jan. 31, 2013.

(51) Int. Cl.
*H02K 41/03* (2006.01)
*B64G 1/28* (2006.01)
*G05D 1/08* (2006.01)

(52) U.S. Cl.
CPC ............ *B64G 1/28* (2013.01); *G05D 1/0883* (2013.01); *H02K 11/215* (2016.01); *H02K 41/031* (2013.01); *H02K 2201/18* (2013.01)

(58) Field of Classification Search
CPC ........... H02K 2201/18; H02K 41/031; H02K 57/00; H02K 57/06; H02K 1/27
USPC .......................................................... 310/38
See application file for complete search history.

(56) References Cited

U.S. PATENT DOCUMENTS 4,611,863 A     9/1986  Isely
4,711,125 A *  12/1987  Morrison ................ G01P 15/18
                                                          73/178 R (Continued)

FOREIGN PATENT DOCUMENTS

DE    2012-205706    * 10/2013    ............ H02K 41/03
JP    2009-296864    * 12/2009    ............ H02K 57/00

(Continued)

OTHER PUBLICATIONS

L. Zhou, "Magnetically Suspended Reaction Sphere with One-axis Hysteresis Drive", Masters Thesis, MIT, Jun. 2014, pp. 1-190.*

(Continued)

*Primary Examiner* — Burton Mullins
(74) *Attorney, Agent, or Firm* — Andrews Kurth LLP; Sean S. Wooden

(57) ABSTRACT

A system and method for controlling and stabilizing a satellite or other vehicle about any axis is disclosed. Embodiments achieve this three-axis control and stabilization with a spherical motor system or reaction sphere capable of storing momentum in a rotor. The spherical motor system comprises a spherical rotor having permanent magnets arranged in evenly-spaced antipodal pairs. Each of the permanent magnets are oriented with the same magnetic pole facing outward from a center of the rotor. The spherical motor system also comprises a stator which has magnetic sensors surrounding electromagnets. The spherical motor system further comprises a control system that controls timing and duration of energization of the electromagnets based on the detection of one of the permanent magnets by the magnetic sensors. Such a spherical motor system provides three-axis stabilization and control of a satellite (or other vehicle).

18 Claims, 27 Drawing Sheets

(56) References Cited

U.S. PATENT DOCUMENTS

| | | | | |
|---|---|---|---|---|
| 4,947,067 | A * | 8/1990 | Habermann | F16F 7/1011 244/170 |
| 5,319,577 | A * | 6/1994 | Lee | B25J 9/126 700/259 |
| 5,413,010 | A * | 5/1995 | Nakanishi | B01F 15/00435 310/156.38 |
| 5,754,023 | A * | 5/1998 | Roston | B25J 9/1689 318/561 |
| 5,798,590 | A * | 8/1998 | Sakakibara | H02K 41/031 310/156.19 |
| 8,164,294 | B2 * | 4/2012 | Chetelat | B64G 1/28 310/181 |
| 9,006,914 | B2 * | 4/2015 | Rapoport | H02K 35/02 290/1 R |
| 9,178,393 | B2 * | 11/2015 | Yano | H02K 41/031 |
| 2009/0230787 | A1 * | 9/2009 | Won | H02K 41/03 310/38 |
| 2010/0264756 | A1 * | 10/2010 | Lee | F04B 35/045 310/38 |
| 2014/0203685 | A1 * | 7/2014 | Vandenba Viere | H02K 41/031 310/323.02 |

FOREIGN PATENT DOCUMENTS

| | | | | |
|---|---|---|---|---|
| WO | WO2007/113666 | A2 | 10/2007 | |
| WO | 2007-148068 | * | 12/2007 | F16M 11/14 |
| WO | 2010-117819 | * | 10/2010 | G01C 21/26 |

OTHER PUBLICATIONS

Wang et al. "Design and Control of a Novel Spherical Permanent Magnet Actuator with Three Degrees of Freedom", IEEE/ASME Transactions on Mechatronics, vol. 8, No. 4, Dec. 2003.*

Rossini et al, "An Optimal Sensor Placement Strategy for Force and Torque Analytical Models of a Reaction Sphere Actuator for Satellite Attitude Control", XXth International Conference on Electrical Machines (ICEM), 2012 pp. 2545-2551, DOI: 10.1109/ICElMach.2012.6350243.*

Yano, T. "Design of a Hexahedron-Octohedron Based Spherical Stepping Motor", 2008, IEEE. International Symposium on Micro-NanoMechatronics and Human Science, 2008. pp. 519-524, DOI: 10.1109/MHS.2008.4752507.*

Yano, T. et al. "Basic Characteristics of a Multi-pole Spherical Synchronous Motor" International Symposium on Micro-NanoMechatronics and Human Science, 2007. pp. 383-388, DOI: 10.1109/MHS.2007.4420885.*

Yano, T. "Proposal of a Truncatedoctahedran-Dodecahedron Based Spherical Stepping Motor" International Conference on Electrical Machines (ICEM), 2010 pp. 1-6, DOI: 10.1109/ICELMACH.2010. 5607903.*

English Machine Translation, Gofuku et al., JP 2009-296864, Dec. 2009.*

"Attitude Stabilization of Satellites by Means of the Free Reaction Sphere", H. Schropl, 1964, translated from German and made available from NASA in Jul. 1965, 27 pages.

* cited by examiner

REACTION SPHERE FOR STABILIZATION AND CONTROL IN THREE AXES

CROSS REFERENCE TO RELATED APPLICATION(S)

This application claims priority from U.S. Provisional Patent Application. No. 61/759,033, filed on Jan. 31, 2013, which is hereby incorporated herein by reference in its entirety.

BACKGROUND

Satellite control systems require momentum to be transferred from the spacecraft body to rotating masses. This is generally accomplished through electrical cylindrical motors turning weighted wheels, one each axis of yaw, pitch, and roll. These are called "reaction wheels." Typical satellite control systems include three (3) reaction wheels and associated control modules. Satellites are limited in size and total mass by the capabilities of the launch platforms available to deploy the satellites in space. As such, typical satellite control systems necessarily have a required amount of hardware and associated mass that takes away from the mass that can be dedicated to payload and other systems that are desirable on a satellite.

The volume and power required by available reaction wheel systems constrain the minimum size of a three-axis stabilized satellite system. Current reaction wheel system enable a minimum size of 10 cubic centimeters (see e.g., CubeSat) Additionally since a cylindrical motor requires bearings which wear out, redundant units may be required for satellite to be able to meet the necessary reliability and life expectancy.

There have been several papers and even a patent over the years describing the general concept of using a spherical motor to control a spacecraft. However, no practical device has ever been produced or developed. See, e.g., "Attitude Stabilization of Satellites by mean of the free reaction sphere" H. Schröpl 1964 translated from the German and made available from NASA in 1965; U.S. Pat. No. 4,611,863, entitled, "Magnetically Supported and Torqued Momentum Reaction Sphere," William Isely, Issued Sep. 16, 1986, PCT Patent Application WO 2007/113666 A2 entitled "Reaction Sphere for Attitude Control;" and NASA SBIR Phase 1 Noqsi Aerospace, Ltd. "A Reaction Sphere for High Performance Attitude Control," study completed Dec. 10, 2011, all of which are hereby incorporated by reference. None of these documents present a workable spherical motor solution. None of these documents adequately solves the problems presented by reaction wheel systems. All of these documents teach considerably different control theories than are presented below.

What is needed is a spherical motor system that is capable of overcoming the problems found in the prior art.

SUMMARY

Embodiments are directed to a spherical motor system for control and stabilization of a vehicle in three orthogonal axes. The system comprises a spherical rotor having permanent magnets positioned in evenly-spaced antipodal pairs. Each of the permanent magnets are oriented with the same magnetic pole facing outward from a center of the rotor. The system also comprises a stator having electromagnets positioned in evenly-spaced antipodal pairs that spatially correspond with the permanent magnets. The stator further has magnetic sensors surrounding at least one of each electromagnet antipodal pair to detect one of the permanent magnets. The system further comprises a control system that controls timing and duration of energization of the electromagnets based on the detection of the one of the permanent magnets with the sensors to provide the electromagnets with the opposite magnetic pole of the permanent magnets in order to attract the permanent magnets whereby momentum is transferred between the rotor and the stator along a controlled vector. The sensors are preferably positioned along the stator such that they detect the permanent magnets only on one hemisphere of the rotor at any time.

In an embodiment, the rotor comprises non-magnetic material between the permanent magnets. The non-magnetic material may be selected from the group consisting of plastic, aluminum, 300-series stainless steel, tungsten, and combinations thereof.

In an embodiment, the at least one electromagnet is centrally positioned within a ring of the sensors. The sensors are preferably hall effect sensors.

In an embodiment, the stator optionally includes a hollow spherical shell surrounding the rotor. The hollow spherical shell comprises a diamagnetic material.

In an embodiment, the vehicle may be a satellite, wherein the stator is connected to the satellite.

Embodiments are also directed to a method for controlling and stabilizing a vehicle in three orthogonal axes. The method comprises similar features that correspond to the above-mentioned system.

BRIEF DESCRIPTION OF THE DRAWINGS

For the present invention to be clearly understood and readily practiced, the present invention will be described in conjunction with the following figures, wherein.

The detailed description will refer to the following drawings in which like numerals refer to like items, and in which.

DETAILED DESCRIPTION

Figure 1A:
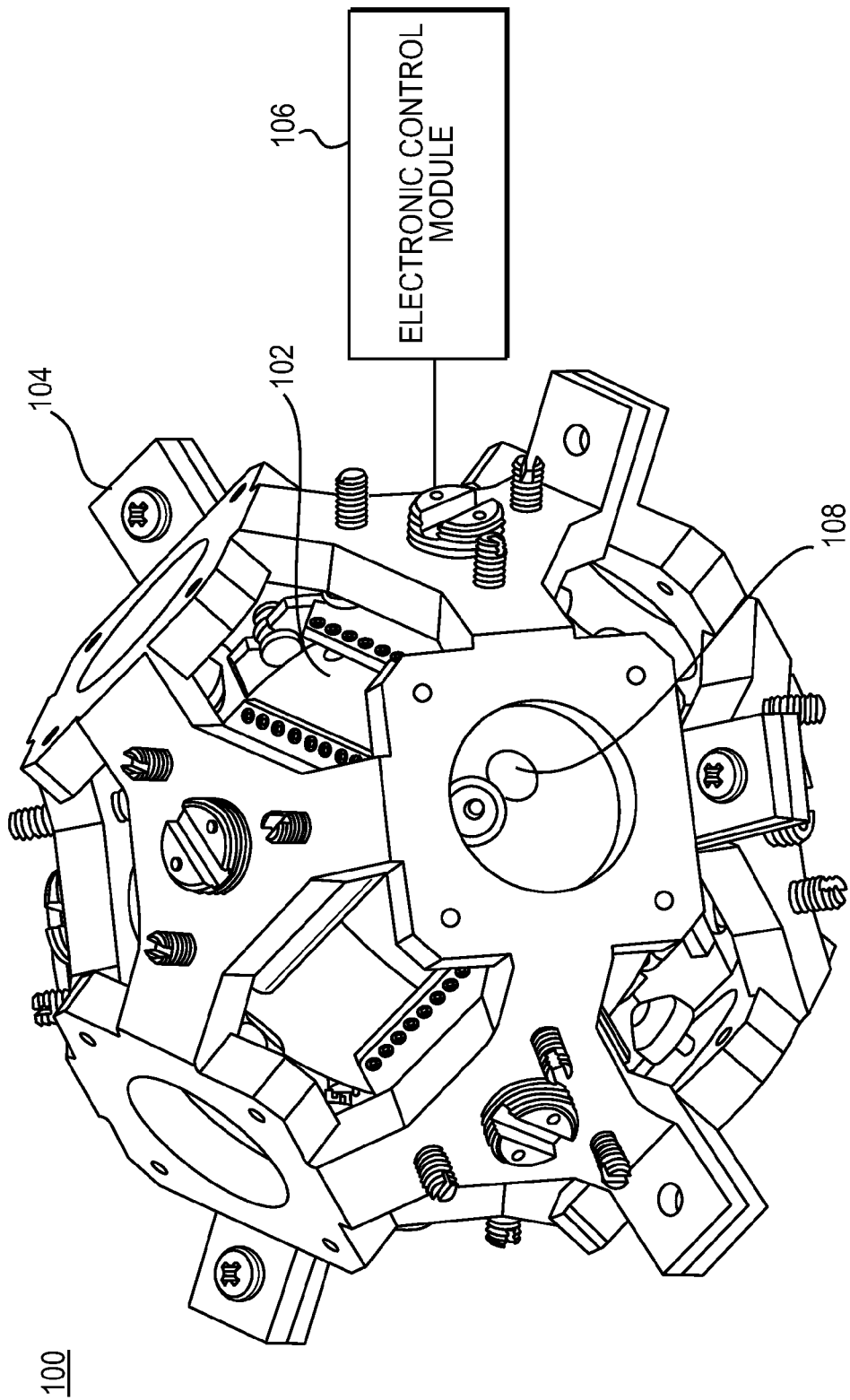
FIGS. 1A-1F are various perspective views and exploded views of a diagram of an embodiment of a spherical motor system for controlling and stabilizing a satellite about any axis. A shell (of a stator) that surrounds the rotor is shown in FIGS. 1E and 1F.
Figure 1B:
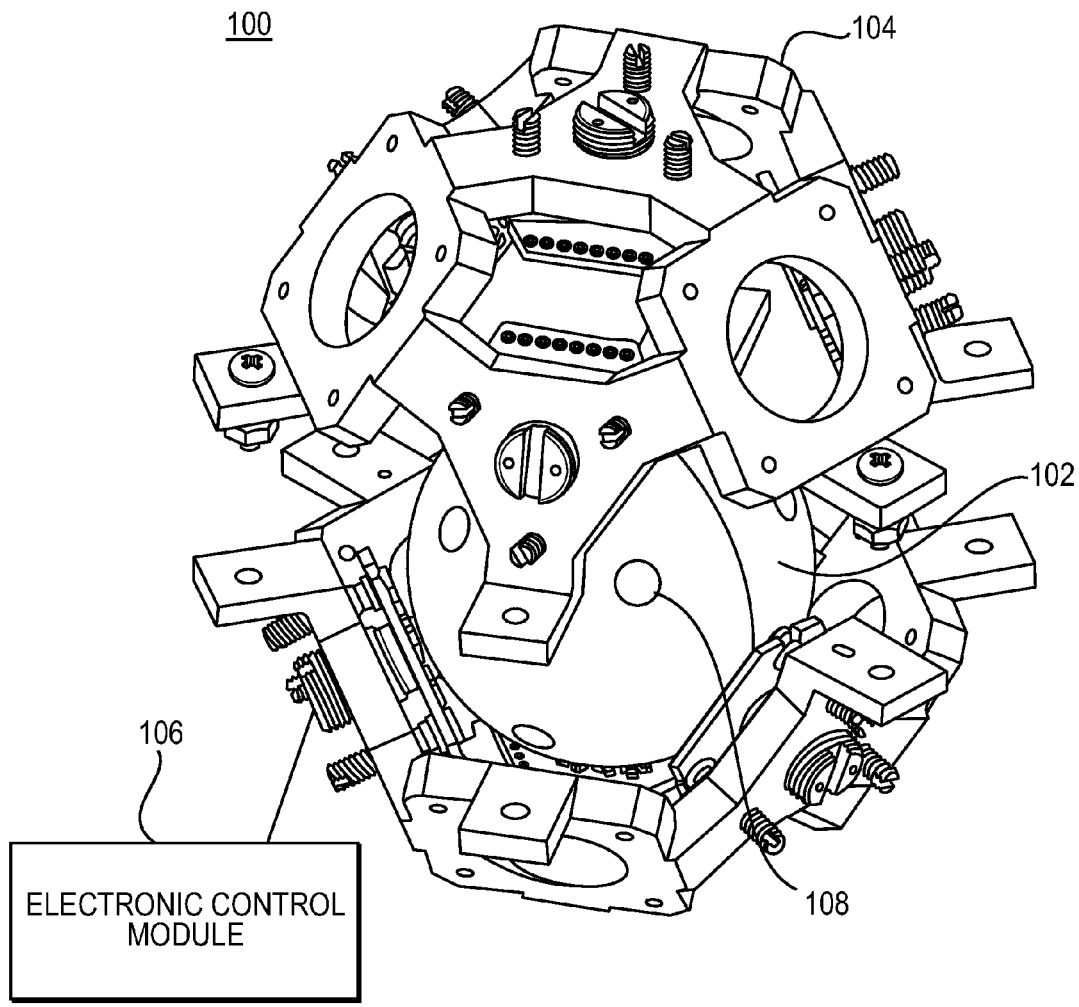

It is to be understood that the figures and descriptions of the present invention may have been simplified to illustrate elements that are relevant for a clear understanding of the present invention, while eliminating, for purposes of clarity, other elements found in a typical three-axis control and stabilization system or typical three-axis control and stabilization method. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Described herein are embodiments of a system and method for controlling and stabilizing a satellite or other vehicle about any axis. Embodiments achieve this control and stabilization with a spherical motor (or "reaction sphere") capable of storing momentum in a rotor. Such a spherical motor provides three-axis stabilization and control of a satellite (or other vehicle), replacing the three (3) reaction wheel systems normally used in satellites. Since embodiments replace a reaction wheel system, embodiments may be referred to as a reaction sphere.

As discussed above, satellite control systems require momentum to be transferred from the spacecraft body to rotating masses. This is generally accomplished through reaction wheels—electrical cylindrical motors turning weighted wheels, one each axis of yaw, pitch, and roll. A spherical motor can accomplish this in one device for all three axes at once, reducing volume, power, mass and complexity. By replacing reaction wheels, embodiments enable satellite solutions not possible with current technologies.

A reaction sphere reduces both the volume and power required to control a satellite, and enables three-axis stabilized satellites of a cubic foot or less, greater than a ten (10)-fold reduction in weight, volume, and complexity versus reaction wheel systems. Embodiments of the reaction sphere as described have no bearing surfaces (being magnetically levitated) and, therefore, has no wear items increasing reliability and expected life of the vehicle. Other embodiments of the reaction sphere have a single bearing surface, that of the rotor itself which may be magnetically levitated.

With reference now to FIGS. 1A-1F, shown are various views and exploded views of a diagram of an embodiment of a spherical motor system 100 for controlling and stabilizing a satellite about any axis (a reaction sphere). The spherical motor system 100 includes a rotor 102, a stator cage 104, and in this case, an electronic control module 106 (illustrated with a block diagram) connected to the spherical motor system 100. In the case of a spherical motor 100, the rotor 102 is a sphere, and the stator 104 optionally includes a hollow spherical shell 114 (shown only in FIGS. 1E and 1F), or shape approximating a hollow spherical shell, ultimately attached in this case to the body of a satellite (not shown). Rotating the rotor 102 will cause an equal and opposite reaction in the stator 104, providing momentum transfer between the two, and enabling control of a satellite or other vehicle about any axis. In effect, the connections or attachments between the satellite and the stator 104 impart movement and momentum to the satellite. This allows the spherical motor system 100 to control the movement and stabilize the satellite about any axis.

Note, for illustration purposes, rotor 102 is shown inside body of stator 104 without shell 114 of stator 104. The shell 114 is only shown in FIGS. 1E and 1F. Fully assembled, the spherical motor system 100 would include shell 114 of stator 104 surrounding rotor 102 inside remaining stator cage 104. Shell 114 would be connected to stator cage 104.

The rotor 102 is a sphere of an appropriate mass, in which is embedded a plethora of permanent magnets 108. These magnets 108 are arranged in antipodal pairs and all with the same magnetic pole facing outward. The rotor 102 can be made of any of a wide range of non-magnetic material, e.g., plastic, aluminum, 300-series stainless steel, or tungsten based on the specific application's mass requirements.

Figure 1C:
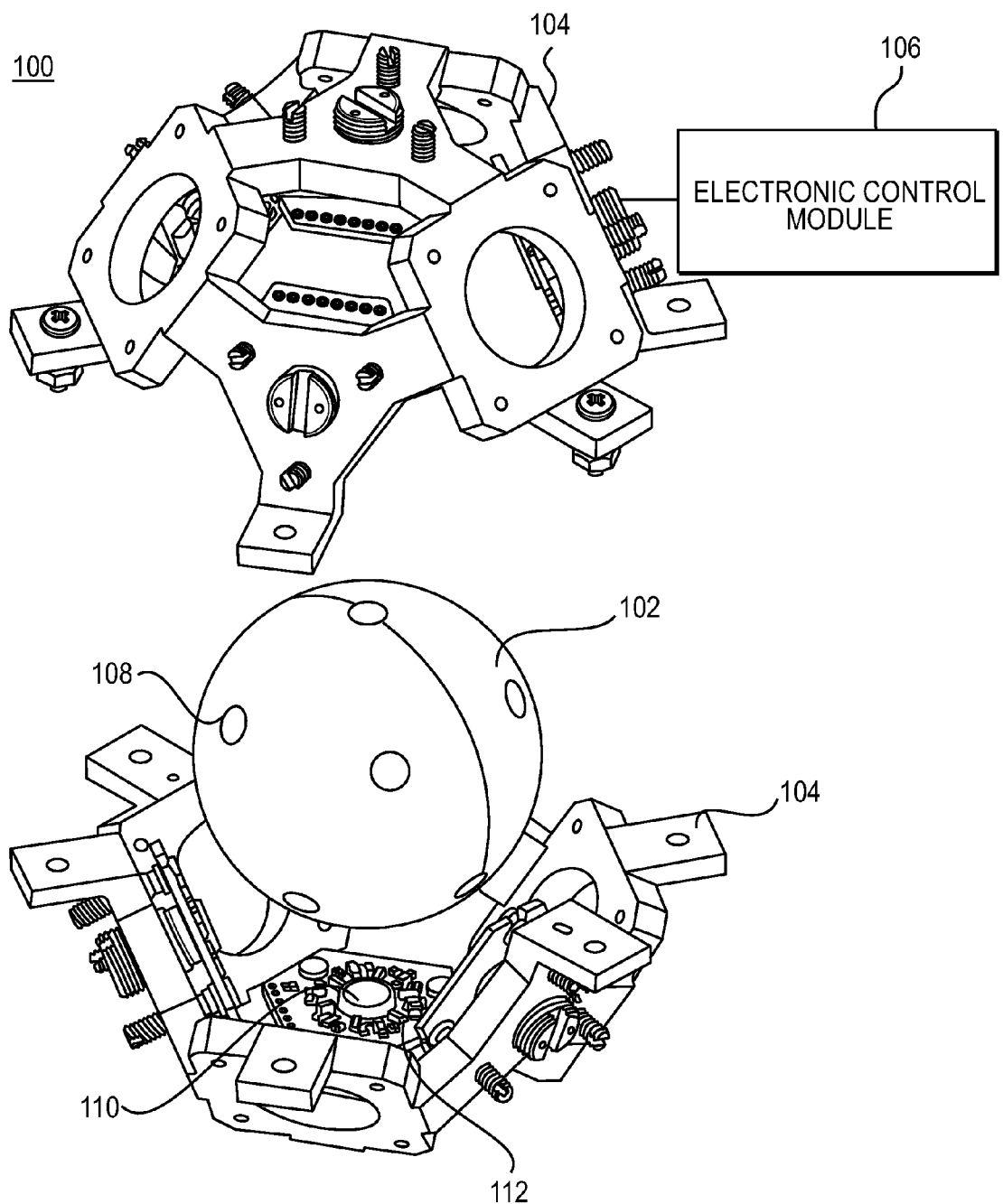
Figure 1D:
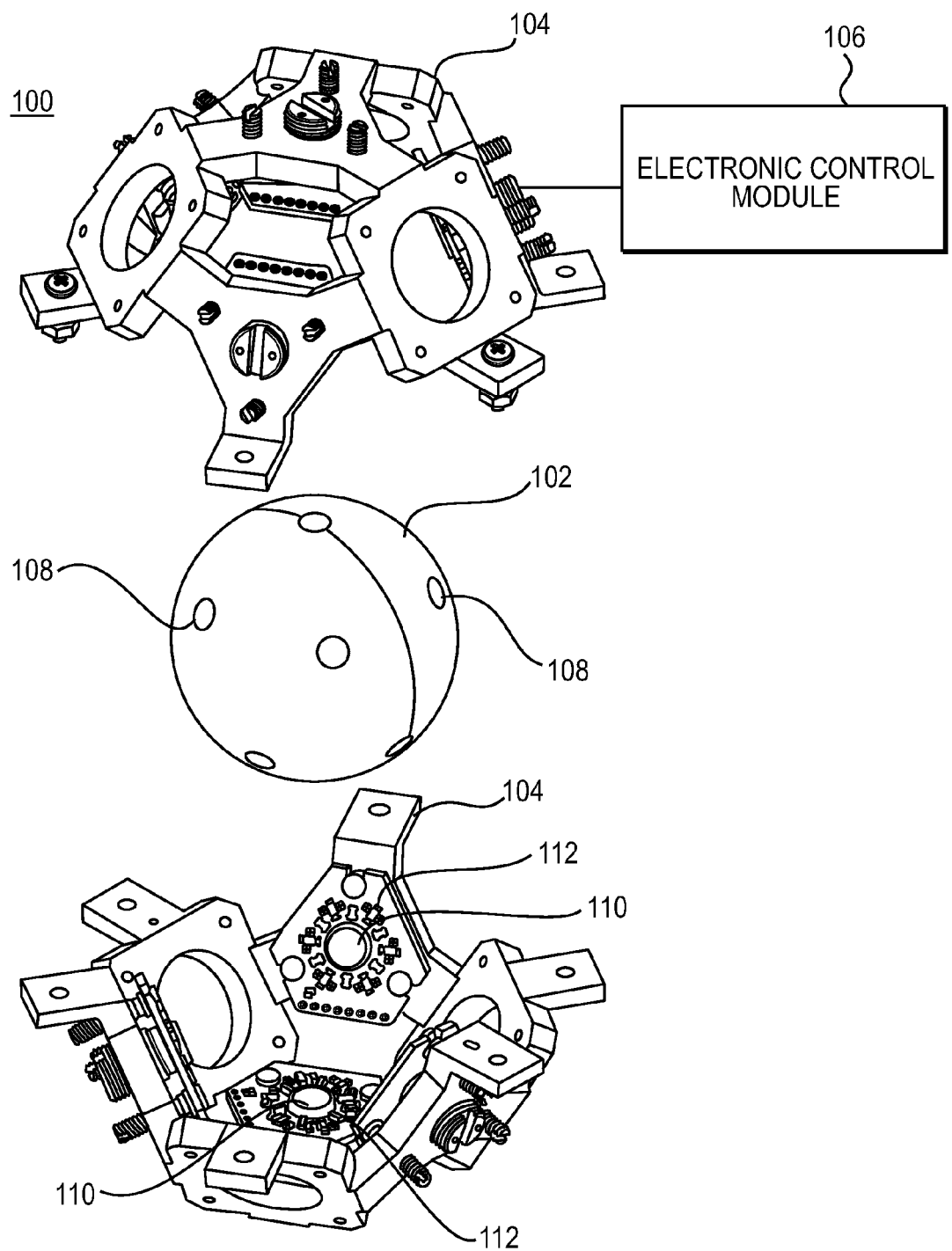
Figure 1E:
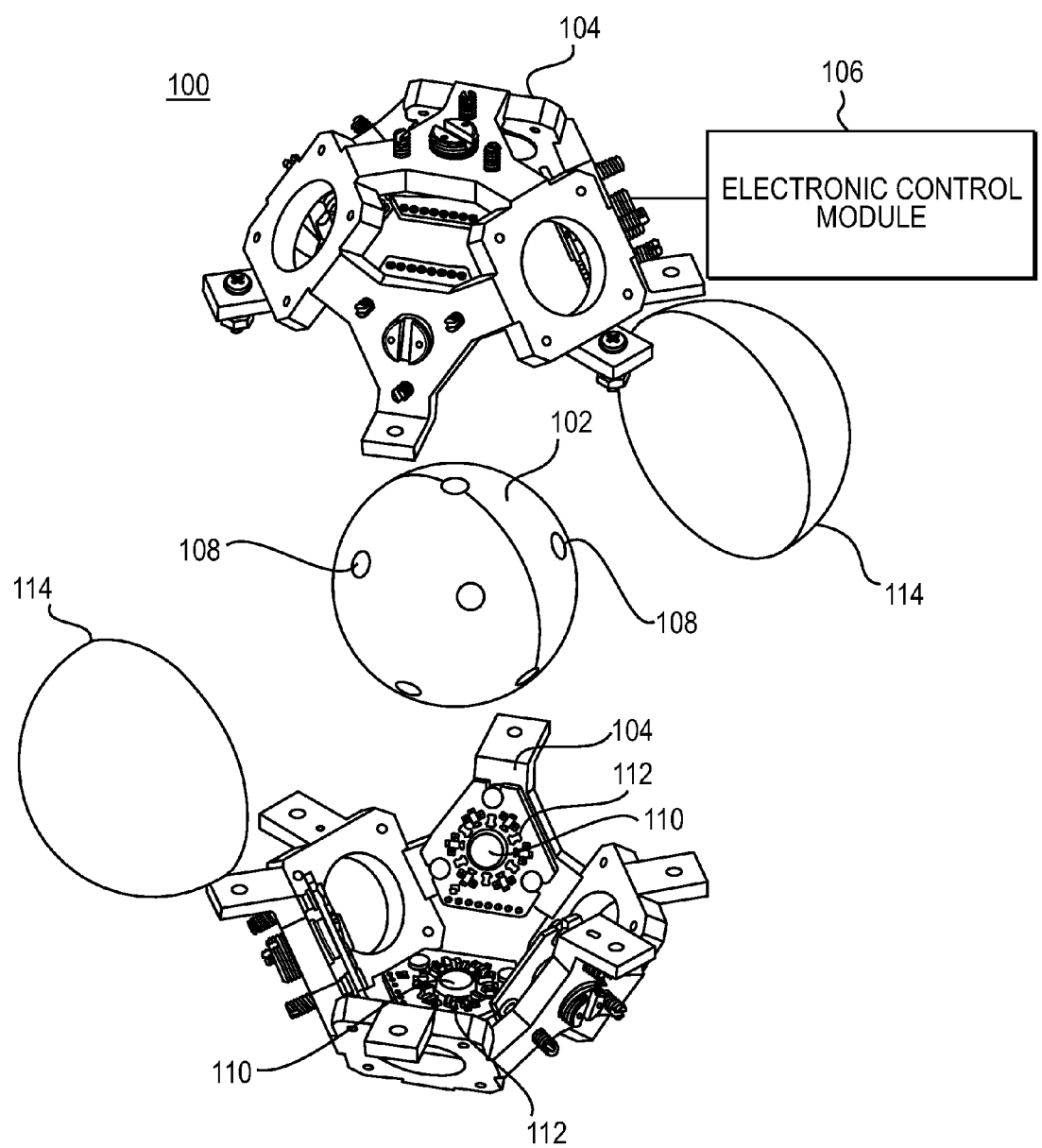
Figure 1F:
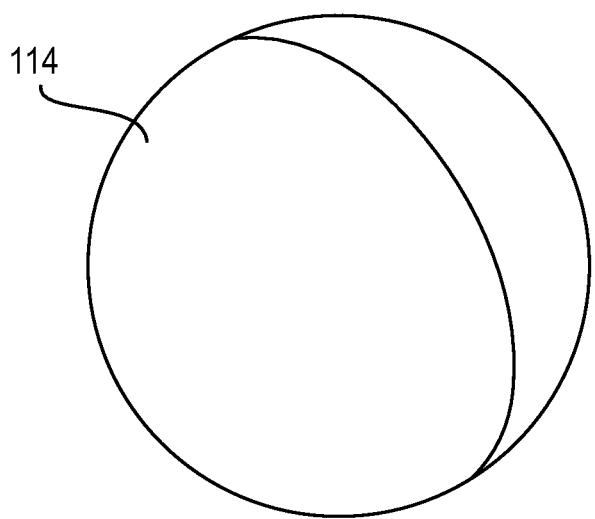

With reference particularly to FIGS. 1C and 1D, the stator 104 contains a plethora of electromagnets 110, also arranged in antipodal pairs, surrounded by a ring of magnetic sensors 112 in close proximity (only one of each electromagnet 110 pair need be surrounded). These electromagnets 110 are energized with the opposite pole of the permanent magnets 108 in the rotor 102 in order to attract the permanent magnets 108 and, consequently, transfer momentum between the rotor 102 and stator 104 along a controlled vector.

The control module 106 is used to determine when to energize the electromagnets 110 and for how long. Attitude Control Software (ACS) code operating in the spacecraft instructs the control module 106 as to which of the magnetic sensors 112 are to be recognized as the firing stimulus for the electromagnets 110. When the appropriate sensor 112 detects a permanent magnet 108, the electromagnet 110 pair is turned on, attracting the permanent magnet 108 pair toward it, inducing rotation of the rotor 102 and stator 104 about the pre-determined axis. The control module 106 also uses the magnetic sensors 112 to determine the current rotation speed and axis of the rotor 102 relative to the stator 104. This is necessary to determine the electromagnetic pulse length (which will need to shorten with increased rotor 102 speed) and to feedback rotation axis and speed to the ACS code.

This arrangement of like-pole out antipodal pair magnets in the rotor 102 will also allow for the magnetic suspension of the rotor 102 inside the stator 104 shell forming a magnetic bearing. Novelty of embodiments described herein is found at least in the control theory of the rotor 102 which is enabled by the construction of the rotor 102 described herein. Additional novelty of certain embodiments may be found in the magnetic levitation described herein. As described, the rotor 102 is a sphere of non-magnetic material in which is embedded a plethora of permanent magnets 108. These magnets are oriented with all the same pole out (S pole out in the prototype) and in antipodal pairs, i.e., each pair is two magnets 108 directly across the diameter of the sphere 102 from each other.

Because the permanent magnets 108 are all same pole out, the magnetic sensors 112 only have to detect one pole, and the electromagnets 110 in the stator 104 only have to be energized with N pole 'in' (toward the sphere 102). The shell 114 of the stator 104 may be a diamagnetic material like pyrolitic graphite. The spherical motor system 100 acts like a free-flying stepper motor where short pulses of the electromagnets 110 impart momentum to the rotor 102, and then are turned off allowing the rotor 102 to continue past the electromagnets 110 and freely spin. The sensors are preferably positioned along the stator 104 such that they detect permanent magnets 108 only on one hemisphere of the rotor 102 at any time.

An additional aspect of the present design is that embodiments are scalable. For example, one prototype includes a 2.25" rotor (chosen because this size is a convenient size for testing—the diameter of a billiard ball which was used as an early test object). In embodiments, the smallest size would be approximately a one inch (1") rotor due to implementing the geometries. There is no theoretical upper limit. For example, rotors as large a several feet in diameter and weighing hundreds of pounds have been discussed. There are actually practical uses for such large devices, such as being used to control extremely large satellites, especially if more than one spherical motor system 100 were to be mounted. The Hubble space telescope or even the International Space Station (ISS) could be controlled by such devices. If a number of spherical motor systems 100 were used—e.g., eight (8), one in each corner of a large cubic satellite—the spherical motor systems 100 would 'appear' to the flight control systems as if there were only one large unit mounted in the center of the satellite geometry. In such an implementation, the spherical motor systems 100 would provide eight (8) times the control authority (momentum transfer) and eight (8) times the redundancy (since the spherical motor systems 100 could operate on fewer devices albeit with less total momentum transfer per unit time).

Early prototype tests indicate that the power efficiency of the spherical motor system 100 as described (as measured in mass versus momentum transfer per unit time) is roughly the same as a single reaction wheel. This combined with the reduced size and reduced complexity of the spherical motor system 100 should provide a three (3) to four (4) times weight and volume savings over reaction wheel systems.

This following is a discussion of the geometry of an embodiment of the spherical motor system 100 and the mathematics necessary for control of the spherical motor system 100. Where possible, this description uses Cartesian coordinates in three (3)-axis space and avoids the use of trigonometric relationships. The description begins by looking at the geometry of the outer sphere (the stator 104), and the equations, relative to the radius of the outer sphere that make up the spherical motor system's 100 coordinate space. In this section, the coordinates of the control node vertices given the coordinate space relative to the radius of the rotor 102 are derived. The geometry of the sensor suite that makes up each control node of the rotor 102 and how it is constructed is discussed. The rotated coordinate space basis vectors for each control node are derived. These basis vectors will be used to form the translation matrices that will be used to determine the direction the sensor will need to pull the rotor 102 given a particular control quaternion. Next, the equations of the desired direction of rotation at each control node based on a given control quaternion are derived. Finally, the rotational vectors derived from the control quaternion into 2D directional vectors for each control node are translated.

Part 1: Generalized Theory

The control theory described below is not restricted to the tetrahedral arrangement of sensor pods described in the following sections. Any arrangement that contains a plethora of antipodal pairs of electromagnets and sensor pods can be realized. The smallest theoretical implementation is three (3) pairs on orthogonal axes. There is no theoretical upper limit. What follows describes one instance of this theory—the way a prototype may be built using a tetrahedral arrangement.

Geometry of the Prototype Outer Sphere (Stator Shell) (Eight (8) Control Nodes)

Some definitions:
Vertex: a point in space representing the corners of a polyhedron
Edge: A line connecting two vertices of a polyhedron.
Face: a flat surface of a polyhedron, bordered by edges
Adjacent vertices: two vertices on a polyhedron that are connected by an edge with no vertices in between.

The coordinate space is defined with origin at the center of the sphere. The positive x axis is oriented horizontally and to the right. The positive y axis is oriented from center to front, and the positive z axis is oriented vertically and up.

Figure 2:
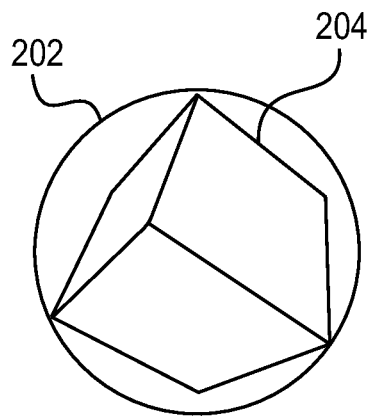
FIG. 2 illustrates a cube inscribed in a sphere and touching the sphere at each of eight (8) vertices.

Given a sphere of radius r, a cube 204 inscribed in the sphere 202 touches the sphere at each of eight (8) vertices (see FIG. 2). The cube is rotated 45 degrees on the x axis and then a little more than 54 degrees on the y axis to bring one vertex straight up and two adjacent vertices above and along the z axis. The long diagonal of the cube is a line that extends from one corner of the one face of the cube through the center of the sphere to the opposite corner of the opposite face of the cube. The diameter d of the sphere is 2r. The above rotation puts one of the cube's long diagonals along the z axis. Since, by definition the length of a diagonal of a cube of side s is $$d=2r=s\sqrt{3}$$

This is verified by observation. A cube with sides s has face diagonals of $\sqrt{2}s$. On side plus one face diagonal forms a right triangle with the long diagonal as the hypotenuse. By the Pythagorean Theorem, $s^2+(\sqrt{2}s)^2=3s^2$ which yields the result.

The sides s of the cube are of length:

$$s = \frac{2}{\sqrt{3}}r$$

Figure 3:
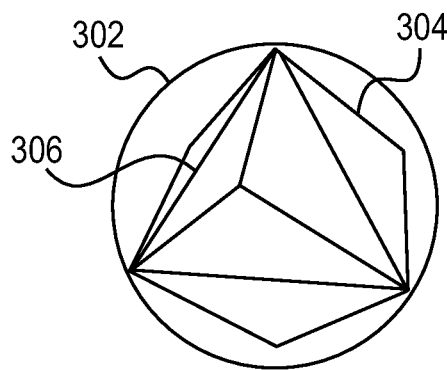
FIG. 3 illustrates an equilateral tetrahedron inscribed in a cube which is inscribed in a sphere.

A face diagonal is defined as the diagonal formed from one corner of the cube to the opposite corner of the square that makes up one face of the cube. Three face diagonals are formed from the upper vertex of the cube and descend along the cube's faces to the three vertices that are adjacent to the lower vertex. These three points are connected to each other along additional face diagonals of adjacent cube faces to form an equilateral tetrahedron with edges e of length (see FIG. 3—one tetrahedron 306 inscribed in both the sphere 302 and the cube 304).

$$e = \frac{2\sqrt{2}}{\sqrt{3}} r$$

Which stands to reason since the face diagonal e of a square with sides s is $$e = \sqrt{2} s$$

Figure 4:
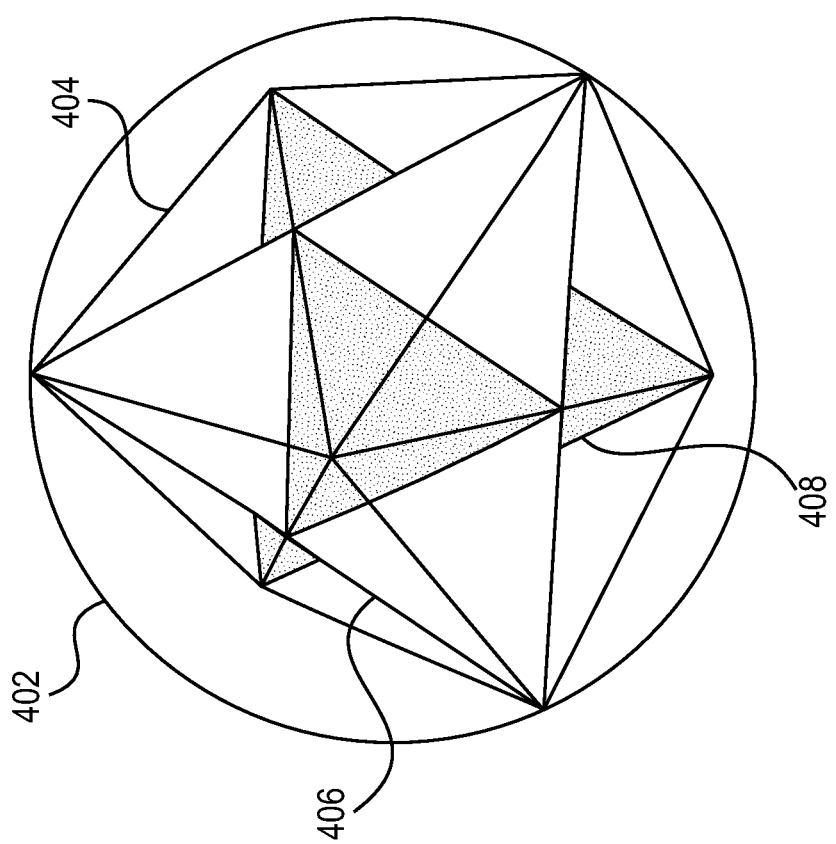
FIG. 4 illustrates two equilateral tetrahedrons inscribed in a cube which is inscribed in a sphere.

A similar equilateral tetrahedron 408 (in addition to the tetrahedron 406 already placed within the cube 404) is formed with edges e upside down and touching the four unconnected vertices of the cube inside the sphere 402 (see FIG. 4—a rendering of the entire tetrahedral construction). Each Vertex of the cube described above represents the location of a control node. The control nodes correspond to the placement of the Electronic Control Modules 106 in the prototype configuration.

Next the geometry of the base of one of the tetrahedrons is examined. It is an equilateral triangle. If a line is drawn bisecting each vertex angle of the triangle these line segments will intersect in the "center" of the triangle. In the case of the base of each tetrahedron described above, the center of the base triangle will be on the z axis. The apex of the triangle is on the z axis as illustrated in FIGS. 5A (base triangle view of the upper tetrahedron) and 5B (base triangle view of the lower (inverse) tetrahedron).

Figure 5A:
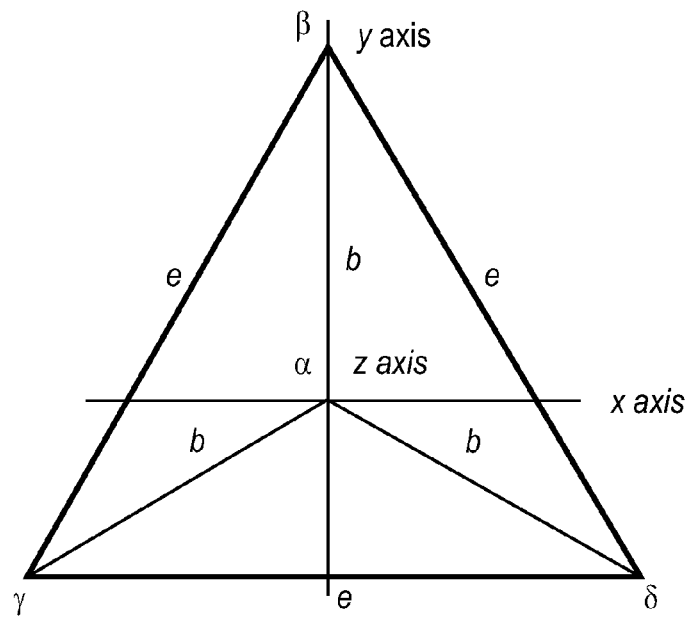
FIG. 5A illustrates a base triangle view of the upper tetrahedron shown in FIG. 4.
Figure 5B:
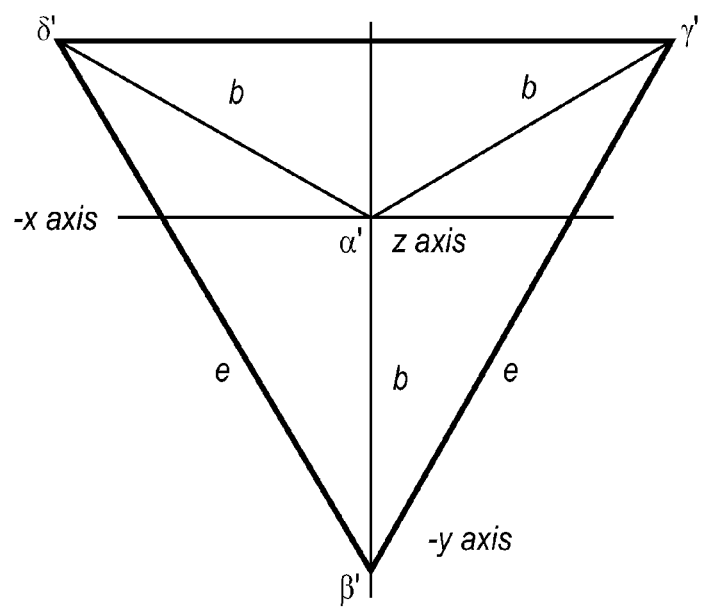
FIG. 5B illustrates a base triangle view of the lower (inverse) tetrahedron shown in FIG. 4.

Note that in the diagrams of FIGS. 5A-5B, the view is looking down the positive y axis. These two triangles are parallel to each other, and half the distance between them is the x-y plane which is also parallel to the two base triangles. The height B of these base triangles can be determined from the Pythagorean Theorem as well. Note that in this case B represents the height of the entire base triangle and, $$e^2 = \left(\frac{e}{2}\right)^2 + B^2$$

Which, when solved for B becomes $$B = \frac{\sqrt{3}}{2} e = \sqrt{2} r$$

The length b from any vertex of the triangle to the center point is ⅔ the height of the base triangle. This is known because the triangle formed from the left corner of the base triangle, its center and the midpoint of its side is a right triangle with 30, 60, 90 degree angles. The height of this triangle (i.e., determined because the sin(30°) is ½) is b/2 and since $$B = b + \frac{b}{2} = \frac{3}{2} b$$

which results in $$b = \frac{2}{3} B$$

When substituting for B above:

$$b = \frac{2\sqrt{2}}{3} r$$

This makes the ratio of e to b as $$\sqrt{3} = \frac{e}{b}$$

Finally, the height h of the tetrahedron (i.e., derived by using the Pythagorean Theorem on the triangle formed from the tetrahedrons base vertex to the center of the base (b), its height to the apex (h), and the line between the apex and the base vertex (e)) from its apex to its base is $$h = \sqrt{e^2 - b^2}$$

$$= \sqrt{e^2 - \frac{e^2}{3}}$$

$$= \sqrt{\frac{2}{3}} e$$

$$= \frac{\sqrt{2}}{\sqrt{3}} e$$

$$= \left(\frac{\sqrt{2}}{\sqrt{3}}\right)\left(\frac{2\sqrt{2}}{\sqrt{3}} r\right)$$

$$= \frac{4}{3} r$$

The next step is to find the height c of the center of the sphere above the base triangle. The center of mass of the sphere is the center of the sphere. The distance from that point to a vertex of the tetrahedron is a simple radius of the sphere (by definition, r) and the distance from the vertex of the base to the center of the base triangle is b. By the Pythagorean Theorem:

$$r^2 = b^2 + c^2 = \left(\frac{2\sqrt{2}}{3} r\right)^2 + c^2$$

and therefore $$c^2 = r^2 - \left(\frac{2\sqrt{2}}{3} r\right)^2 = r^2 \left(1 - \frac{8}{9}\right) = \frac{r^2}{3^2}$$

This means that the rotation point c around which the tetrahedron rotates (center of mass) is $$c = \frac{1}{3} r$$

above the base of the tetrahedron, where r is the radius of the sphere in which the tetrahedron is inscribed. The next step is to locate each of the eight points that make up the vertices of the structure in terms of x, y, z coordinates.

Each base triangle is r/3 above or below the x-y plane. If the tetrahedron is labeled αβγδ with as the vertex on the y axis, γ is the vertex in the negative x axis, δ is the vertex in the positive x axis and the apex of the tetrahedron labeled as a on the z axis; then the coordinates of each of these vertices (Note that the x terms for $V_\gamma$ and $V_\delta$ are e/2 and the z terms are b/2) V in terms of the radius of the sphere is:

$$V_\alpha = (0, 0, r)$$

$$V_\beta = \left(0, \frac{2\sqrt{2}}{3}r, -\frac{r}{3}\right)$$

$$V_\gamma = \left(-\frac{\sqrt{2}}{\sqrt{3}}r, -\frac{\sqrt{2}}{3}r, -\frac{r}{3}\right)$$

$$V_\delta = \left(\frac{\sqrt{2}}{\sqrt{3}}r, -\frac{\sqrt{2}}{3}r, -\frac{r}{3}\right)$$

The vertices of the lower tetrahedron are similarly labeled α'β'γ'δ'. The lower vertex becomes V'α, the vertex on the negative z axis is V'β, the vertex in the positive x axis will be V'γ, and the vertex in the negative x axis will be V'δ. This means that Vα and V'α are diametrically opposed as are Vβ and V'β, Vγ and V'γ, and Vδ and V'δ.

Therefore the coordinates of the prime vertices become $$V'_\alpha = (0, 0, -r)$$

$$V'_\beta = \left(0, -\frac{2\sqrt{2}}{3}r, \frac{r}{3}\right)$$

$$V'_\gamma = \left(\frac{\sqrt{2}}{\sqrt{3}}r, \frac{\sqrt{2}}{3}r, \frac{r}{3}\right)$$

$$V'_\delta = \left(-\frac{\sqrt{2}}{\sqrt{3}}r, \frac{\sqrt{2}}{3}r, \frac{r}{3}\right)$$

Basis at Each Vertex From the "Geometry of the Outer Sphere" above, the coordinates of each vertex of the primary tetrahedron are defined in terms of the radius of the sphere. These are shown in Table 1:

TABLE 1

| Vertex Position Vectors (from above) | Unit Vectors |
|---|---|
| $V_\alpha = (0, 0, r)$ | $V_\alpha = (0, 0, 1)$ |
| $V_\beta = \left(0, \frac{2\sqrt{2}}{3}r, -\frac{r}{3}\right)$ | $V_\beta = \left(0, \frac{2\sqrt{2}}{3}, -\frac{1}{3}\right)$ |
| $V_\gamma = \left(-\frac{\sqrt{2}}{\sqrt{3}}r, -\frac{\sqrt{2}}{3}r, -\frac{r}{3}\right)$ | $V_\gamma = \left(-\frac{\sqrt{2}}{\sqrt{3}}, -\frac{\sqrt{2}}{3}, -\frac{1}{3}\right)$ |
| $V_\delta = \left(\frac{\sqrt{2}}{\sqrt{3}}r, -\frac{\sqrt{2}}{3}r, -\frac{r}{3}\right)$ | $V_\delta = \left(\frac{\sqrt{2}}{\sqrt{3}}, -\frac{\sqrt{2}}{3}, -\frac{1}{3}\right)$ |
| $V'_\alpha = (0, 0, -r)$ | $V'_\alpha = (0, 0, -1)$ |
| $V'_\beta = \left(0, -\frac{2\sqrt{2}}{3}r, \frac{r}{3}\right)$ | $V'_\beta = \left(0, -\frac{2\sqrt{2}}{3}, \frac{1}{3}\right)$ |
| $V'_\gamma = \left(\frac{\sqrt{2}}{\sqrt{3}}r, \frac{\sqrt{2}}{3}r, \frac{r}{3}\right)$ | $V'_\gamma = \left(\frac{\sqrt{2}}{\sqrt{3}}, \frac{\sqrt{2}}{3}, \frac{1}{3}\right)$ |
| $V'_\delta = \left(-\frac{\sqrt{2}}{\sqrt{3}}r, \frac{\sqrt{2}}{3}r, \frac{r}{3}\right)$ | $V'_\delta = \left(-\frac{\sqrt{2}}{\sqrt{3}}, \frac{\sqrt{2}}{3}, \frac{1}{3}\right)$ |

The above lists the vertex position vectors of the primary tetrahedron on the left. The normalized forms of these vectors (which assumes a sphere of radius r=1) is given on the right. In general bold type indicates a normalized vector.

The next step is to determine the basis vectors for the coordinate system in which the x-y plane is tangent to the sphere at each vertex. For vertices β, γ, and δ, the y axis will be in a similar direction (note that since these points are below the equator on the sphere, the y axis will be "tilted outward" slightly, but still orthonormal to the sphere's x axis) as the y axis at the origin of the sphere and the x axis will be parallel to the x axis of the origin of the sphere. The x axis vector, then for β, γ, and δ will be the unit vectors formed from the cross product of their normalized vectors (Vβ, Vγ, and Vδ) with the normalized Vα vector (Vα, which is on the y axis). The result will be parallel to the sphere's x axis. The y axis vector for β, γ, and δ will be the unit vector formed from the cross product of the vertex with the x axis vector for the coordinate. For example, for vertex β, βi is made from the cross product (note that the angle between vertex vectors is approximately 109.471°, which is a little less than the 120° found in the relationship between the base vertices and the center of the base triangle) of Vβ and Vα, |βi| indicates its magnitude and the unit basis vector for the β vertex will be iβ. The relations are as follows.

$$\beta_i = V_\alpha \times V_\beta = \begin{pmatrix} V_{\alpha y}V_{\beta z} - V_{\alpha z}V_{\beta y} \\ V_{\alpha z}V_{\beta x} - V_{\alpha x}V_{\beta z} \\ V_{\alpha x}V_{\beta y} - V_{\alpha y}V_{\beta x} \end{pmatrix} = \begin{pmatrix} -\frac{2\sqrt{2}}{3} \\ 0 \\ 0 \end{pmatrix}$$

$$|\beta_i| = \sqrt{\left(-\frac{2\sqrt{2}}{3}\right)^2 + (0)^2 + (0)^2} = \frac{2\sqrt{2}}{3}$$

$$i_\beta = \frac{\beta_i}{|\beta_i|} = \begin{pmatrix} -1 \\ 0 \\ 0 \end{pmatrix}$$

Note also that the magnitude of $\beta_i$ is not 1. The magnitude of a cross product is given as |a||b|sin θ where a and b are the vectors and θ is the angle between them (approximately) 109.47122°. In this case the magnitude of $V_\alpha$ and $V_\beta$ are both 1 making the following relationship true $$\sin\theta = \frac{2\sqrt{2}}{3}$$

Similarly, for vector $V_\beta$, $\beta_j$ is made from the cross product of $i_\beta$ and $V_\beta$, $|\beta_j|$ indicates its magnitude and the unit basis vector for the $V_\beta$ vector will be $j_\beta$. The relations are as follows.

$$\beta_j = V_\beta \times i_\beta = \begin{pmatrix} V_{\beta y} i_{\beta z} - V_{\beta z} i_{\beta y} \\ V_{\beta z} i_{\beta x} - V_{\beta x} i_{\beta z} \\ V_{\beta x} i_{\beta y} - V_{\beta y} i_{\beta x} \end{pmatrix} = \begin{pmatrix} 0 \\ \frac{1}{3} \\ \frac{2\sqrt{2}}{3} \end{pmatrix}$$

$$|\beta_j| = \sqrt{(0)^2 \left(\frac{1}{3}\right)^2 + \left(\frac{2\sqrt{2}}{3}\right)^2} = \sqrt{\frac{1}{9} + \frac{8}{9}} = \frac{3}{3} = 1$$

$$j_\beta = \frac{\beta_j}{|\beta_j|} = \begin{pmatrix} 0 \\ \frac{1}{3} \\ \frac{2\sqrt{2}}{3} \end{pmatrix}$$

Note that because $i_\beta$ is normal to $V_\beta$, the magnitude $|\beta_j|$ is 1. A quick look back at the geometry of the outer sphere will verify these results. The $i_\beta$ is a unit vector parallel to the x axis and points in the negative x direction. In this case it is also perpendicular to the z axis because of the definition of the location of $\beta$. The $j_\beta$ is a unit vector perpendicular to the x axis but below the x-z plane and pointing upwards (in the positive y direction). It is also perpendicular to $\beta$. This is indicated by its positive y and z coordinates. A quick check will reveal that the length of $j_\beta$ is 1.

It is important to look a little more closely at the derivation of the j basis vector as it is the cross product of a cross product. Note that the calculation takes the cross product of $\beta$ with the first cross product found when deriving the i basis ($\beta_i$). Effectively $\beta_j$ and $\beta_i$ will form a plane that is orthogonal to the original vector $\beta$. This, by definition, is what is desired since that means it is tangent to the sphere at $\beta$. The new vector will also point in a similar direction as a. Also the magnitude of $\beta_j$ (which is perpendicular to $\beta$) is given from the following.

$$|\beta_j| = |i_\beta||\beta| \sin 90° = (1)(1)(1) = 1$$

The $\gamma$ and $\delta$ basis vectors are derived in the same way, first by taking the cross product of each with a, and then by deriving the second basis vector by taking the cross product of the prior vector with the point vector.

For $\gamma$ the equations yield the following.

$$\gamma_i = V_\alpha \times V_\gamma = \begin{pmatrix} V_{\alpha y} V_{\gamma z} - V_{\alpha z} V_{\gamma y} \\ V_{\alpha z} V_{\gamma x} - V_{\alpha x} V_{\gamma z} \\ V_{\alpha x} V_{\gamma y} - V_{\alpha y} V_{\gamma x} \end{pmatrix} = \begin{pmatrix} \frac{\sqrt{2}}{3} \\ -\frac{\sqrt{2}}{\sqrt{3}} \\ 0 \end{pmatrix}$$

$$|\gamma_i| = \sqrt{\left(\frac{\sqrt{2}}{3}\right)^2 + \left(-\frac{\sqrt{2}}{\sqrt{3}}\right)^2 + (0)^2} = \frac{2\sqrt{2}}{3}$$

$$i_\gamma = \frac{\gamma_i}{|\gamma_i|} = \begin{pmatrix} \frac{1}{2} \\ -\frac{\sqrt{3}}{2} \\ 0 \end{pmatrix}$$

and $$\gamma_j = V_\gamma \times i_\gamma = \begin{pmatrix} V_{\gamma y} i_{\gamma z} - V_{\gamma z} i_{\gamma y} \\ V_{\gamma z} i_{\gamma x} - V_{\gamma x} i_{\gamma z} \\ V_{\gamma x} i_{\gamma y} - V_{\gamma y} i_{\gamma x} \end{pmatrix} = \begin{pmatrix} -\frac{1}{2\sqrt{3}} \\ -\frac{1}{6} \\ \frac{2\sqrt{2}}{3} \end{pmatrix}$$

$$|\gamma_j| = \sqrt{\left(-\frac{1}{2\sqrt{3}}\right)^2 + \left(-\frac{1}{6}\right)^2 + \left(\frac{2\sqrt{2}}{3}\right)^2}$$

$$= \sqrt{\frac{3}{36} + \frac{1}{36} + \frac{32}{36}}$$

$$= \sqrt{\frac{36}{36}}$$

$$= 1$$

$$j_\gamma = \frac{\gamma_j}{|\gamma_j|} = \begin{pmatrix} -\frac{1}{2\sqrt{3}} \\ -\frac{1}{6} \\ \frac{2\sqrt{2}}{3} \end{pmatrix}$$

For $\delta$ the equations yield the following.

$$\delta_i = V_\alpha \times V_\delta = \begin{pmatrix} V_{\alpha y} V_{\delta z} - V_{\alpha z} V_{\delta y} \\ V_{\alpha z} V_{\delta x} - V_{\alpha x} V_{\delta z} \\ V_{\alpha x} V_{\delta y} - V_{\alpha y} V_{\delta x} \end{pmatrix} = \begin{pmatrix} \frac{\sqrt{2}}{3} \\ \frac{\sqrt{2}}{\sqrt{3}} \\ 0 \end{pmatrix}$$

$$|\delta_i| = \sqrt{\left(\frac{\sqrt{2}}{3}\right)^2 + \left(\frac{\sqrt{2}}{\sqrt{3}}\right)^2 + (0)^2} = \frac{2\sqrt{2}}{3}$$

$$i_\delta = \frac{\delta_i}{|\delta_i|} = \begin{pmatrix} \frac{1}{2} \\ \frac{\sqrt{3}}{2} \\ 0 \end{pmatrix}$$

and $$\delta_j = V_\delta \times i_\delta = \begin{pmatrix} V_{\delta y} i_{\delta z} - V_{\delta z} i_{\delta y} \\ V_{\delta z} i_{\delta x} - V_{\delta x} i_{\delta z} \\ V_{\delta x} i_{\delta y} - V_{\delta y} i_{\delta x} \end{pmatrix} = \begin{pmatrix} \frac{1}{2\sqrt{3}} \\ -\frac{1}{6} \\ \frac{2\sqrt{2}}{3} \end{pmatrix}$$

$$|\delta_j| = \sqrt{\left(\frac{1}{2\sqrt{3}}\right)^2 + \left(-\frac{1}{6}\right)^2 + \left(\frac{2\sqrt{2}}{3}\right)^2} = \sqrt{\frac{3}{36} + \frac{1}{36} + \frac{32}{36}} = 1$$

$$j_\delta = \frac{\delta_j}{|\delta_j|} = \begin{pmatrix} \frac{1}{2\sqrt{3}} \\ -\frac{1}{6} \\ \frac{2\sqrt{2}}{3} \end{pmatrix}$$

For the α point the y axis is oriented in the direction of β and put the x axis parallel to the sphere's x axis. This yields the following results.

$$\alpha_i = V_\beta \times V_\alpha = \begin{pmatrix} V_{\beta y}V_{\alpha z} - V_{\beta z}V_{\alpha y} \\ V_{\beta z}V_{\alpha x} - V_{\beta x}V_{\alpha z} \\ V_{\beta x}V_{\alpha y} - V_{\beta y}V_{\alpha x} \end{pmatrix} = \begin{pmatrix} \frac{2\sqrt{2}}{3} \\ 0 \\ 0 \end{pmatrix}$$

$$|\alpha_i| = \sqrt{\left(\frac{2\sqrt{2}}{3}\right)^2 + (0)^2 + (0)^2} = \frac{2\sqrt{2}}{3}$$

$$i_\alpha = \frac{\alpha_i}{|\alpha_i|} = \begin{pmatrix} 1 \\ 0 \\ 0 \end{pmatrix}$$

and $$\alpha_j = V_\alpha \times i_\alpha = \begin{pmatrix} V_{\alpha y}i_{\alpha z} - V_{\alpha z}i_{\alpha y} \\ V_{\alpha z}i_{\alpha x} - V_{\alpha x}i_{\alpha z} \\ V_{\alpha x}i_{\alpha y} - V_{\alpha y}i_{\alpha x} \end{pmatrix} = \begin{pmatrix} 0 \\ 1 \\ 0 \end{pmatrix}$$

$$|\alpha_j| = \sqrt{(0)^2 + (1)^2 + (0)^2} = 1$$

$$j_\alpha = \frac{\alpha_j}{|\alpha_j|} = \begin{pmatrix} 0 \\ 1 \\ 0 \end{pmatrix}$$

Note that the derivation of each set of the basis vectors described above produces four orthonormal bases, one for each vertex, in the original coordinate system.

The basis vectors for the tangent planes oriented at each point of the control tetrahedron have now been derived. The next step is to determine the rotational direction at each vertex given the Control Quaternion, which defines the desired rotational direction and speed. The basis vectors for the primed points have also been derived as these would be similar to the unprimed vectors with the only difference being the sign of each term in the j component. See Table 2.

TABLE 2

$$i_\alpha = \frac{\alpha_i}{|\alpha_i|} = \begin{pmatrix} 1 \\ 0 \\ 0 \end{pmatrix}$$

$$j_\alpha = \frac{\alpha_j}{|\alpha_j|} = \begin{pmatrix} 0 \\ 1 \\ 0 \end{pmatrix}$$

$$i_\beta = \frac{\beta_i}{|\beta_i|} = \begin{pmatrix} -1 \\ 0 \\ 0 \end{pmatrix}$$

TABLE 2-continued $$j_\beta = \frac{\beta_j}{|\beta_j|} = \begin{pmatrix} 0 \\ \frac{1}{3} \\ \frac{2\sqrt{2}}{3} \end{pmatrix}$$

$$i_\gamma = \frac{\gamma_i}{|\gamma_i|} = \begin{pmatrix} \frac{1}{2} \\ -\frac{\sqrt{3}}{2} \\ 0 \end{pmatrix}$$

$$j_\gamma = \frac{\gamma_j}{|\gamma_j|} = \begin{pmatrix} -\frac{1}{2\sqrt{3}} \\ -\frac{1}{6} \\ \frac{2\sqrt{2}}{3} \end{pmatrix}$$

$$i_\delta = \frac{\delta_i}{|\delta_i|} = \begin{pmatrix} \frac{1}{2} \\ \frac{\sqrt{3}}{2} \\ 0 \end{pmatrix}$$

$$j_\delta = \frac{\delta_j}{|\delta_j|} = \begin{pmatrix} \frac{1}{2\sqrt{3}} \\ -\frac{1}{6} \\ \frac{2\sqrt{2}}{3} \end{pmatrix}$$

$$i_{\alpha'} = \frac{\alpha'_i}{|\alpha'_i|} = \begin{pmatrix} 1 \\ 0 \\ 0 \end{pmatrix}$$

$$j_{\alpha'} = \frac{\alpha'_j}{|\alpha'_j|} = \begin{pmatrix} 0 \\ -1 \\ 0 \end{pmatrix}$$

$$i_{\beta'} = \frac{\beta'_i}{|\beta'_i|} = \begin{pmatrix} 1 \\ 0 \\ 0 \end{pmatrix}$$

$$j_{\beta'} = \frac{\beta'_j}{|\beta'_j|} = \begin{pmatrix} 0 \\ -\frac{1}{3} \\ -\frac{2\sqrt{2}}{3} \end{pmatrix}$$

$$i_{\gamma'} = \frac{\gamma'_i}{|\gamma'_i|} = \begin{pmatrix} -\frac{1}{2} \\ \frac{\sqrt{3}}{2} \\ 0 \end{pmatrix}$$

$$j_{\gamma'} = \frac{\gamma'_j}{|\gamma'_j|} = \begin{pmatrix} \frac{1}{2\sqrt{3}} \\ \frac{1}{6} \\ -\frac{2\sqrt{2}}{3} \end{pmatrix}$$

TABLE 2-continued $$i_{\delta'} = \frac{\delta'_i}{|\delta'_i|} = \begin{pmatrix} -\frac{1}{2} \\ -\frac{\sqrt{3}}{2} \\ 0 \end{pmatrix}$$

$$j_{\delta'} = \frac{\delta'_j}{|\delta'_j|} = \begin{pmatrix} -\frac{1}{2\sqrt{3}} \\ \frac{1}{6} \\ -\frac{2\sqrt{2}}{3} \end{pmatrix}$$

In the next section, the equations needed to control the sphere about an arbitrary axis are derived.

Control Axis

In this section, the equations for the direction of rotation for each vertex point given a desired rotation about some arbitrary axis are derived. The controller will supply a set of values which represents the desired axis of rotation of the inner sphere. This set of values will be given in the coordinate space of the reaction sphere as it has been described in Geometry of the Outer Sphere.

The control rotation can be given by a set of values containing a vector v indicating the axis of rotation and a scalar value ω indicating the angular velocity.

$$\omega+v=\omega+(ai+bj+ck)$$

The basis vectors in three-space that define the origin of the environment for embodiments of the spherical motor are (i, j, k) (that is, the center of the rotating sphere). The values (a, b, c) represents a point on a unit sphere that defines the location of the positive axis of rotation. It is required to be a unit vector. Therefore $$a^2+b^2+c^2=1$$

Figure 6:
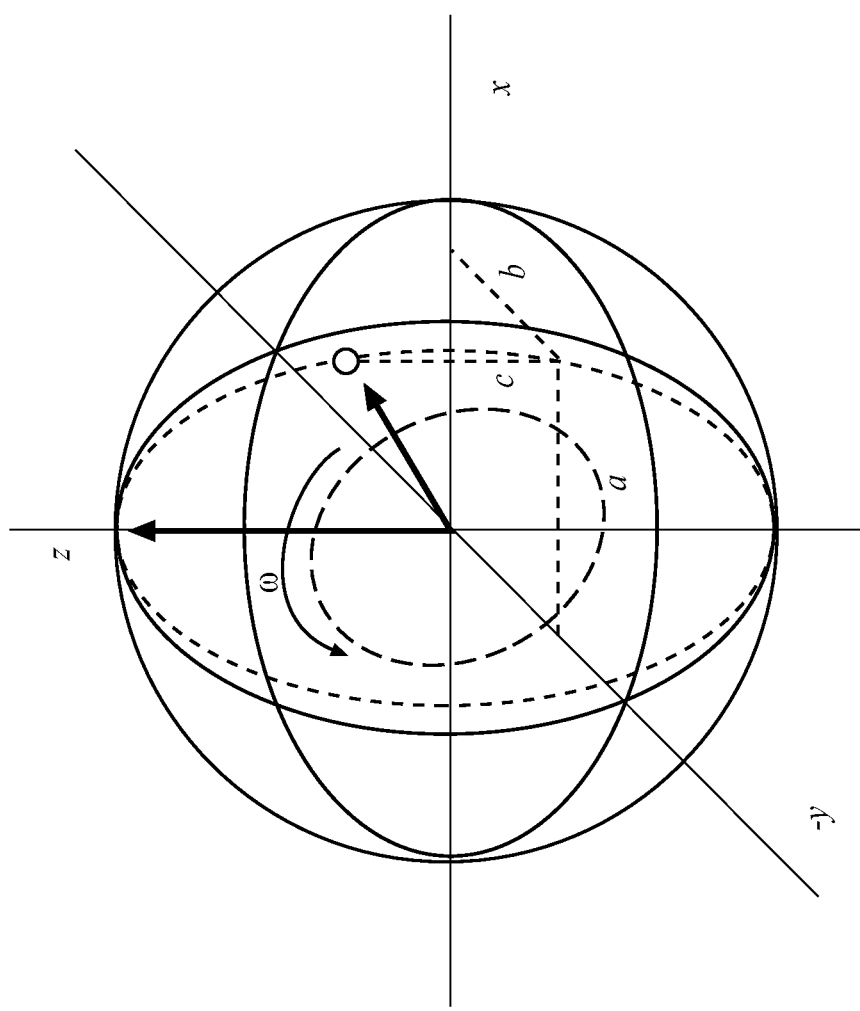
FIG. 6 illustrates a representation of the sphere geometry for a nominal control axis of $\omega + (ai + bj + ck)$.

Using the right hand rule (the right hand grips the axis the thumb points in the positive direction of the axis of rotation and the fingers point in the positive direction of rotation (positive ω) allows precise definition of the desired direction of rotation of the sphere. FIG. 6 illustrates a representation of the sphere geometry for a nominal control axis of ω+(ai+bj+ck).

This angular velocity given in ω becomes something that must be projected onto the electronic control modules 106. That is, the desired rotation of the sphere must be expressed in terms of the two dimensional rings of sensors positioned around the sphere. Therefore, this direction of motion must be converted into a linear direction relative to the four orthonormal vertices calculated in "Basis at Each Vertex".

Rotation will occur on the plane perpendicular to the vector that represents the control axis. Any point of the great circle plane that intersects the point and the axis point (and the center) will define a rotation vector perpendicular to it. If the point on the sphere is the axis point or diametrically opposed to the axis point, then the surface vector magnitude is 0 and its direction is undefined.

The vertex vector is defined as v and the axis vector is defined as u. A simple cross product between the two vectors will yield a vector perpendicular to the plane defined by them both. That vector should be the vector of the desired spin direction in the plane of the sensor.

$$u \times v$$

The following vectors in Table 3 describe the positions in space of the eight sensors of the prototype configuration.

TABLE 3

$V_\alpha = (0, 0, 1)$ $V'_\alpha = (0, 0, -1)$ $V_\beta = \left(0, \frac{2\sqrt{2}}{3}, -\frac{1}{3}\right)$ $V'_\beta = \left(0, -\frac{2\sqrt{2}}{3}, \frac{1}{3}\right)$ $V_\gamma = \left(-\frac{\sqrt{2}}{\sqrt{3}}, -\frac{\sqrt{2}}{3}, -\frac{1}{3}\right)$ $V'_\gamma = \left(\frac{\sqrt{2}}{\sqrt{3}}, \frac{\sqrt{2}}{3}, \frac{1}{3}\right)$ $V_\delta = \left(\frac{\sqrt{2}}{\sqrt{3}}, -\frac{\sqrt{2}}{3}, -\frac{1}{3}\right)$ $V'_\delta = \left(-\frac{\sqrt{2}}{\sqrt{3}}, \frac{\sqrt{2}}{3}, \frac{1}{3}\right)$ Therefore, the angle of the rotation vector for each sensor is the cross product of its position with the vector of the axis determined from the control axis. If the coordinates of the sensor vectors are labeled with subscripts x, y, z, to indicate the coordinate represented and label the parameters of the control axis a, b, c as above, then the Cross Product directional vector U for each sensor becomes as follows in Table 4.

TABLE 4

$U_\alpha = u \times V_\alpha$ $$= \begin{pmatrix} b\alpha_z - c\alpha_y \\ c\alpha_x - a\alpha_z \\ a\alpha_y - b\alpha_x \end{pmatrix}$$

$$= \begin{pmatrix} b \\ -a \\ 0 \end{pmatrix}$$

$U_{\alpha'} = u \times V'_\alpha$ $$= \begin{pmatrix} b\alpha'_z - c\alpha'_y \\ c\alpha'_x - a\alpha'_z \\ a\alpha'_y - b\alpha'_x \end{pmatrix}$$

$$= \begin{pmatrix} -b \\ a \\ 0 \end{pmatrix}$$

TABLE 4-continued $$U_\beta = u \times V_\beta$$
$$= \begin{pmatrix} b\beta_z - c\beta_y \\ c\beta_x - a\beta_z \\ a\beta_y - b\beta_x \end{pmatrix}$$
$$= \begin{pmatrix} -\frac{1}{3}(b + 2\sqrt{2}\,c) \\ \frac{1}{3}a \\ \frac{2\sqrt{2}}{3}a \end{pmatrix}$$

$$U'_\beta = u \times V'_\beta$$
$$= \begin{pmatrix} b\beta'_z - c\beta'_y \\ c\beta'_x - a\beta'_z \\ a\beta'_y - b\beta'_x \end{pmatrix}$$
$$= \begin{pmatrix} \frac{1}{3}(b + 2\sqrt{2}\,c) \\ -\frac{1}{3}a \\ -\frac{2\sqrt{2}}{3}a \end{pmatrix}$$

$$U_\gamma = u \times V_\gamma$$
$$= \begin{pmatrix} b\gamma_z - c\gamma_y \\ c\gamma_x - a\gamma_z \\ a\gamma_y - b\gamma_x \end{pmatrix}$$
$$= \begin{pmatrix} -\frac{1}{3}(b - \sqrt{2}\,c) \\ \frac{1}{3}(a - \sqrt{6}\,c) \\ -\frac{\sqrt{2}}{3}(a - \sqrt{3}\,b) \end{pmatrix}$$

$$U'_\gamma = u \times V'_\gamma$$
$$= \begin{pmatrix} b\gamma'_z - c\gamma'_y \\ c\gamma'_x - a\gamma'_z \\ a\gamma'_y - b\gamma'_x \end{pmatrix}$$
$$= \begin{pmatrix} \frac{1}{3}(b - \sqrt{2}\,c) \\ -\frac{1}{3}(a - \sqrt{6}\,c) \\ \frac{\sqrt{2}}{3}(a - \sqrt{3}\,b) \end{pmatrix}$$

$$U_\delta = u \times V_\delta$$
$$= \begin{pmatrix} b\delta_z - c\delta_y \\ c\delta_x - a\delta_z \\ a\delta_y - b\delta_x \end{pmatrix}$$
$$= \begin{pmatrix} -\frac{1}{3}(b - \sqrt{2}\,c) \\ \frac{1}{3}(a + \sqrt{6}\,c) \\ -\frac{\sqrt{2}}{3}(a + \sqrt{3}\,b) \end{pmatrix}$$

$$U'_\delta = u \times V'_\delta$$
$$= \begin{pmatrix} b\delta'_z - c\delta'_y \\ c\delta'_x - a\delta'_z \\ a\delta'_y - b\delta'_x \end{pmatrix}$$
$$= \begin{pmatrix} \frac{1}{3}(b - \sqrt{2}\,c) \\ -\frac{1}{3}(a + \sqrt{6}\,c) \\ \frac{\sqrt{2}}{3}(a + \sqrt{3}\,b) \end{pmatrix}$$

The prime vectors are identical to the corresponding vectors except for the sign. This is verified by the fact that each prime vector is diametrically opposed to the corresponding vector. This provides the rotation vectors in space. The next step is to determine the projection of these vectors relative to each sensor.

Projection of Directional Vectors

In this section, the direction of the Control Axis' rotation is derived in terms of each sensor vertex. The derivation of the Directional Vectors in terms of the sensors at each vertex of the primary tetrahedron requires a translation of basis from the coordinate space of the sphere to the coordinate space of the plane tangent to the sphere at each point in the control tetrahedron. It is known, from the derivation of the Directional Vectors, that they are tangent to the sphere, which means they are coplanar with the plane defined by the basis vectors derived above in the section named "Basis at Each Vertex".

Since the directional vectors are coplanar with the local basis vectors, there is no need to translate the third dimension. That basis is a unit vector in the same direction of the vertex vector and its component for the Directional Vector will always be 0.

The translation matrixes for the conversions are formed from the orthonormal basis vectors derived in the Basis at Each Vertex. Since the magnitude of that vector is r, the coordinates of k is the same as its origin point with the r factors removed. This becomes the third row in the basis matrix.

$$M_\alpha = \begin{bmatrix} i_\alpha & j_\alpha & \alpha \end{bmatrix} = \begin{bmatrix} 1 & 0 & 0 \\ 0 & 1 & 0 \\ 0 & 0 & 1 \end{bmatrix}$$

$$M_\beta = \begin{bmatrix} i_\beta & j_\beta & \beta \end{bmatrix} = \begin{bmatrix} -1 & 0 & 0 \\ 0 & \frac{1}{3} & \frac{2\sqrt{2}}{3} \\ 0 & \frac{2\sqrt{2}}{3} & -\frac{1}{3} \end{bmatrix}$$

$$M_\gamma = \begin{bmatrix} i_\gamma & j_\gamma & \gamma \end{bmatrix} = \begin{bmatrix} \frac{1}{2} & -\frac{1}{2\sqrt{3}} & -\frac{\sqrt{2}}{\sqrt{3}} \\ -\frac{\sqrt{3}}{2} & -\frac{1}{6} & -\frac{\sqrt{2}}{3} \\ 0 & \frac{2\sqrt{2}}{3} & -\frac{1}{3} \end{bmatrix}$$

-continued $$M_\delta = [\, i_\delta \quad j_\delta \quad \delta \,] = \begin{bmatrix} \frac{1}{2} & \frac{1}{2\sqrt{3}} & \frac{\sqrt{2}}{\sqrt{3}} \\ \frac{\sqrt{3}}{2} & -\frac{1}{6} & -\frac{\sqrt{2}}{3} \\ 0 & \frac{2\sqrt{2}}{3} & -\frac{1}{3} \end{bmatrix}$$

And for the prime vertices:

$$M_{\alpha'} = [\, i_{\alpha'} \quad j_{\alpha'} \quad \alpha' \,] = \begin{bmatrix} -1 & 0 & 0 \\ 0 & -1 & 0 \\ 0 & 0 & -1 \end{bmatrix}$$

$$M_{\beta'} = [\, i_{\beta'} \quad j_{\beta'} \quad \beta' \,] = \begin{bmatrix} 1 & 0 & 0 \\ 0 & -\frac{1}{3} & -\frac{2\sqrt{2}}{3} \\ 0 & -\frac{2\sqrt{2}}{3} & \frac{1}{3} \end{bmatrix}$$

$$M_{\gamma'} = [\, i_{\gamma'} \quad j_{\gamma'} \quad \gamma' \,] = \begin{bmatrix} -\frac{1}{2} & \frac{1}{2\sqrt{3}} & \frac{\sqrt{2}}{\sqrt{3}} \\ \frac{\sqrt{3}}{2} & \frac{1}{6} & \frac{\sqrt{2}}{3} \\ 0 & -\frac{2\sqrt{2}}{3} & \frac{1}{3} \end{bmatrix}$$

$$M_{\delta'} = [\, i_{\delta'} \quad j_{\delta'} \quad \delta' \,] = \begin{bmatrix} -\frac{1}{2} & -\frac{1}{2\sqrt{3}} & -\frac{\sqrt{2}}{\sqrt{3}} \\ -\frac{\sqrt{3}}{2} & \frac{1}{6} & \frac{\sqrt{2}}{3} \\ 0 & -\frac{2\sqrt{2}}{3} & \frac{1}{3} \end{bmatrix}$$

For the vector U in the new coordinate space (call it U'), the basic conversion equation becomes as follows.

$U' = M^{-1}U = M^T U$ (where $M^{-1} = M^T$ for orthogonal matrices)

Therefore, to determine the desired direction of spin about an arbitrary axis for the eight (8) vertex prototype, it then becomes a simple matrix multiplication to translate the Rotation vectors into the 2D coordinate space of each sensor node. These are derived for the eight (8) vertex configuration as follows.

$$U'_\alpha = M_\alpha^{-1} U_\alpha = \begin{bmatrix} 1 & 0 & 0 \\ 0 & 1 & 0 \\ 0 & 0 & 1 \end{bmatrix} \begin{bmatrix} b \\ -a \\ 0 \end{bmatrix} = \begin{bmatrix} b \\ -a \\ 0 \end{bmatrix}$$

$$U'_\beta = M_B^{-1} U_\beta$$

$$= \begin{bmatrix} -1 & 0 & 0 \\ 0 & \frac{1}{3} & \frac{2\sqrt{2}}{3} \\ 0 & \frac{2\sqrt{2}}{3} & -\frac{1}{3} \end{bmatrix} \begin{bmatrix} -\frac{1}{3}(b + 2\sqrt{2}\,c) \\ \frac{1}{3}a \\ \frac{2\sqrt{2}}{3}a \end{bmatrix}$$

$$= \begin{bmatrix} \frac{1}{3}(b + 2\sqrt{2}\,c) \\ a \\ 0 \end{bmatrix}$$

$$U'_\gamma = M_\gamma^{-1} U_\gamma$$

$$= \begin{bmatrix} \frac{1}{2} & -\frac{\sqrt{3}}{2} & 0 \\ -\frac{1}{2\sqrt{3}} & -\frac{1}{6} & \frac{2\sqrt{2}}{3} \\ -\frac{\sqrt{2}}{\sqrt{3}} & -\frac{\sqrt{2}}{3} & -\frac{1}{3} \end{bmatrix} \begin{bmatrix} -\frac{1}{3}(b - \sqrt{2}\,c) \\ \frac{1}{3}(a - \sqrt{6}\,c) \\ -\frac{\sqrt{2}}{3}(a - \sqrt{3}\,b) \end{bmatrix}$$

$$= \begin{bmatrix} -\frac{1}{6}(\sqrt{3}\,a + b - 4\sqrt{2}\,c) \\ \frac{1}{2}(a - \sqrt{3}\,b) \\ 0 \end{bmatrix}$$

$$U'_\delta = M_\delta^{-1} U_\delta$$

$$= \begin{bmatrix} \frac{1}{2} & \frac{\sqrt{3}}{2} & 0 \\ \frac{1}{2\sqrt{3}} & -\frac{1}{6} & \frac{2\sqrt{2}}{3} \\ \frac{\sqrt{2}}{\sqrt{3}} & -\frac{\sqrt{2}}{3} & -\frac{1}{3} \end{bmatrix} \begin{bmatrix} -\frac{1}{3}(b - \sqrt{2}\,c) \\ \frac{1}{3}(a + \sqrt{6}\,c) \\ -\frac{\sqrt{2}}{3}(a + \sqrt{3}\,b) \end{bmatrix}$$

$$= \begin{bmatrix} -\frac{1}{6}(-\sqrt{3}\,a + b - 4\sqrt{2}\,c) \\ -\frac{1}{2}(a + \sqrt{3}\,b) \\ 0 \end{bmatrix}$$

Note that, as expected, the z coordinate of each translated vector is 0.

$$U'_{\alpha'} = M_{\alpha'}^{-1} U_{\alpha'} = \begin{bmatrix} -1 & 0 & 0 \\ 0 & -1 & 0 \\ 0 & 0 & -1 \end{bmatrix} \begin{bmatrix} -b \\ a \\ 0 \end{bmatrix} = \begin{bmatrix} -b \\ -a \\ 0 \end{bmatrix}$$

$$U'_{\beta'} = M_{\beta'}^{-1} U_{\beta'}$$

$$= \begin{bmatrix} 1 & 0 & 0 \\ 0 & -\frac{1}{3} & -\frac{2\sqrt{2}}{3} \\ 0 & -\frac{2\sqrt{2}}{3} & \frac{1}{3} \end{bmatrix} \begin{bmatrix} \frac{1}{3}(b + 2\sqrt{2}\,c) \\ -\frac{1}{3}a \\ -\frac{2\sqrt{2}}{3}a \end{bmatrix}$$

$$= \begin{bmatrix} -\frac{1}{3}(b + 2\sqrt{2}\,c) \\ -a \\ 0 \end{bmatrix}$$

-continued $$U'_{\gamma'} = M_{\gamma'}^{-1} U_{\gamma'}$$

$$= \begin{bmatrix} -\frac{1}{2} & \frac{\sqrt{3}}{2} & 0 \\ \frac{1}{2\sqrt{3}} & \frac{1}{6} & -\frac{2\sqrt{2}}{3} \\ \frac{\sqrt{2}}{\sqrt{3}} & \frac{\sqrt{2}}{3} & \frac{1}{3} \end{bmatrix} \begin{bmatrix} \frac{1}{3}(b - \sqrt{2}c) \\ -\frac{1}{3}(a - \sqrt{6}c) \\ \frac{\sqrt{2}}{3}(a - \sqrt{3}b) \end{bmatrix}$$

$$= \begin{bmatrix} \frac{1}{6}(\sqrt{3}a + b + 4\sqrt{2}c) \\ -\frac{1}{2}(a - \sqrt{3}b) \\ 0 \end{bmatrix}$$

$$U'_{\delta'} = M_{\delta'}^{-1} U_{\delta'}$$

$$= \begin{bmatrix} -\frac{1}{2} & -\frac{\sqrt{3}}{2} & 00 \\ -\frac{1}{2\sqrt{3}} & \frac{1}{6} & -\frac{2\sqrt{2}}{3} \\ -\frac{\sqrt{2}}{\sqrt{3}} & \frac{\sqrt{2}}{3} & \frac{1}{3} \end{bmatrix} \begin{bmatrix} \frac{1}{3}(b - \sqrt{2}c) \\ -\frac{1}{3}(a + \sqrt{6}c) \\ \frac{\sqrt{2}}{3}(a + \sqrt{3}b) \end{bmatrix}$$

$$= \begin{bmatrix} \frac{1}{6}(-\sqrt{3}a + b - 4\sqrt{2}c) \\ \frac{1}{2}(a + \sqrt{3}b) \\ 0 \end{bmatrix}$$

The rotational vectors of the sphere at each sensor vertex for the primary (upright) tetrahedron have now been described in terms of the rotational parameters of the control axis. The directional vectors for the secondary (primed) tetrahedron vertices for are not derived two reasons. First, they are not derived because they will differ from the primary vertices only in sign, and second, they are not derived because they form a special relationship with the primary vertices. This relationship will be described in detail in the following sections.

Deriving the Control Axis from the Vertex Vectors

In this section it is assumed that the rotation of the sphere is read from the vertex sensors and that it is desired to derive the current axis of rotation parameters from that view. This is an inversion operation from the sections above called Projecting Directional Vectors and the Control Axis.

In this instance, the x and y components of linear direction of rotation of the sphere are given at each of the four vertices. The primary vertices are derived first. Note that in every case, the matrices M represent orthogonal basis vectors. These matrices are inverted in order to derive U' from U. In the opposite case, U' is known and it is desirable to derive U. To invert this operation, the un-transposed matrix is used as follows.

$$U_\alpha = M_\alpha U'_\alpha = \begin{bmatrix} 1 & 0 & 0 \\ 0 & 1 & 0 \\ 0 & 0 & 1 \end{bmatrix} \begin{bmatrix} V'_{\alpha x} \\ V'_{\alpha y} \\ 0 \end{bmatrix} = \begin{bmatrix} V'_{\alpha x} \\ V'_{\alpha y} \\ 0 \end{bmatrix}$$

$$U_\beta = M_\beta U'_\beta$$

$$= \begin{bmatrix} -1 & 0 & 0 \\ 0 & \frac{1}{3} & \frac{2\sqrt{2}}{3} \\ 0 & \frac{2\sqrt{2}}{3} & -\frac{1}{3} \end{bmatrix} \begin{bmatrix} V'_{\beta x} \\ V'_{\beta y} \\ 0 \end{bmatrix}$$

$$= \begin{bmatrix} -V'_{\beta x} \\ \frac{1}{3} V'_{\beta y} \\ \frac{2\sqrt{2}}{3} V'_{\beta y} \end{bmatrix}$$

$$U_\gamma = M_\gamma U'_\gamma$$

$$= \begin{bmatrix} \frac{1}{2} & -\frac{1}{2\sqrt{3}} & -\frac{\sqrt{2}}{\sqrt{3}} \\ -\frac{\sqrt{3}}{2} & -\frac{1}{6} & -\frac{\sqrt{2}}{3} \\ 0 & \frac{2\sqrt{2}}{3} & -\frac{1}{3} \end{bmatrix} \begin{bmatrix} V'_{\gamma x} \\ V'_{\gamma y} \\ 0 \end{bmatrix}$$

$$= \begin{bmatrix} \frac{1}{2\sqrt{3}}(\sqrt{3} V'_{\gamma x} - V'_{\gamma y}) \\ -\frac{1}{6}(3\sqrt{3} V'_{\gamma x} + V'_{\gamma y}) \\ \frac{2\sqrt{2}}{3} V'_{\gamma y} \end{bmatrix}$$

$$U_\delta = M_\delta U'_\delta$$

$$= \begin{bmatrix} \frac{1}{2} & \frac{1}{2\sqrt{3}} & \frac{\sqrt{2}}{\sqrt{3}} \\ \frac{\sqrt{3}}{2} & -\frac{1}{6} & -\frac{\sqrt{2}}{3} \\ 0 & \frac{2\sqrt{2}}{3} & -\frac{1}{3} \end{bmatrix} \begin{bmatrix} V'_{\delta x} \\ V'_{\delta y} \\ 0 \end{bmatrix}$$

$$= \begin{bmatrix} \frac{1}{2\sqrt{3}}(\sqrt{3} V'_{\delta x} + V'_{\delta y}) \\ \frac{1}{6}(3\sqrt{3} V'_{\delta x} - V'_{\delta y}) \\ \frac{2\sqrt{2}}{3} V'_{\delta y} \end{bmatrix}$$

This provides the Vectors U of the sphere's rotation in terms of the sphere's origin basis vectors. Because of the way these four vectors were derived above, all four of them are orthogonal to the control axis. Therefore, the control axis should be able to be derived as the cross product of any two of the above vectors as shown in Table 5.

TABLE 5

| $U_\alpha \times U_\beta$ | $U_\beta \times U_\alpha$ | $U_\gamma \times U_\alpha$ | $U_\delta \times U_\alpha$ |
| $U_\alpha \times U_\gamma$ | $U_\beta \times U_\gamma$ | $U_\gamma \times U_\beta$ | $U_\delta \times U_\beta$ |
| $U_\alpha \times U_\delta$ | $U_\beta \times U_\delta$ | $U_\gamma \times U_\delta$ | $U_\delta \times U_\gamma$ |

The twelve above cross products will produce exactly twelve vectors, six of which will be parallel to each other and parallel to the control axis and six will be parallel to each other and diametrically opposed to the control axis.

One of the translated vectors is designated as $U_m$ and another as $U_n$ where m and n are either α, β, γ, or δ. Then the equation of the unit vector in the direction of the control axis becomes as follows.

$$u = U_m \times U_n$$

and so $$u = \frac{U_m \times U_n}{|U_m \times U_n|}$$

After having performed above cross product, the resulting vector u will be either equivalent to the control axis or in the opposite direction of the control axis. The next challenge is to determine which.

The unit vector of the vertex from which $U_m$ was derived is designated as $V_m$. Then, if the original cross product is performed again using the newly derived control axis vector u, a new vector $U_t$ that is either in the same direction or in the opposite direction of $U_m$ should result.

$$U_t = u \times V_m$$

The dot product of $U_m$ and $U_t$ will produce a measure of the angle between them.

$$\theta = \cos^{-1} \frac{U_m \cdot U_t}{|U_m||U_t|}$$

If $U_m$ and $U_t$ are normalized then first this equation reduces to the following.

$$\theta = \cos^{-1} U_m \cdot U_t$$

The value of $\theta$ will either be 0 or $\pi$. If it is 0, then u is calculated in the correct direction. Conversely If it is $\pi$, then $-u$ is in the correct direction. As a shortcut, the calculation of the inverse cosine may be skipped. If the dot product of the two unit vectors is 1, then u is in the correct direction. Conversely If the dot product is $-1$, then $-u$ is in the correct direction.

The above illustrates how to derive the direction of motion at each vertex given an axis of rotation and reversed the process and derived the axis of rotation given the directions of motions from any two vertices. In the next section, the problem of determining the linear velocity of a point on the surface of the ball at each vertex given the axis of rotation and the angular velocity of the sphere is illustrated.

The next step in the analysis is to determine how much momentum to impart at each of the vertex points. To arrive at this value embodiments must make use of the angular velocity ($\omega$) parameter provided in the Control Axis. The linear velocity L of the control axis at each of the four vertex points needs to be determined.

Projecting Linear Velocities

Figure 7:
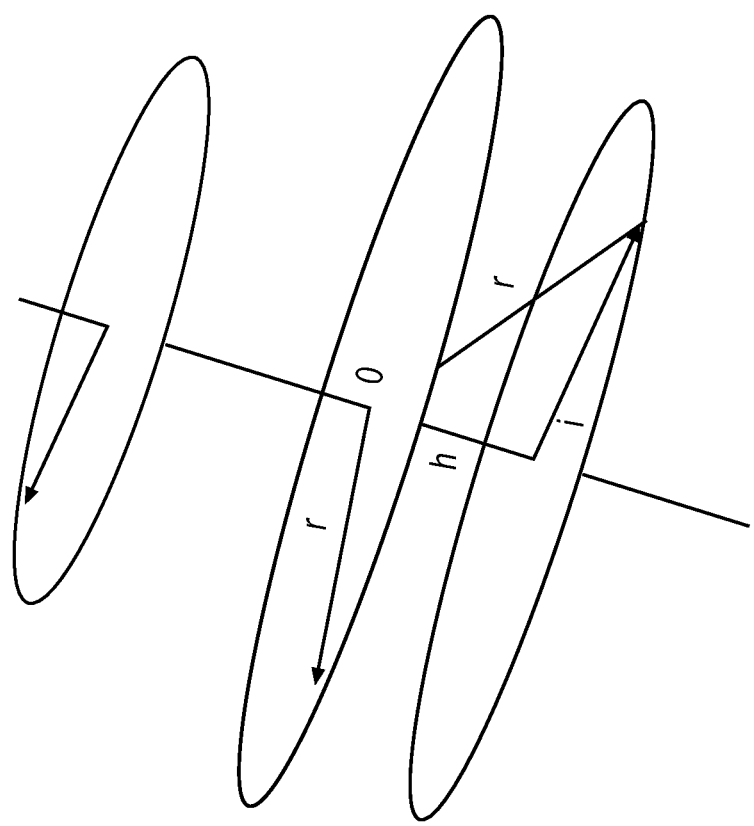
FIG. 7 illustrates three cross sections of a sphere with origin along the axis of rotation.

In this section the amount of rotational velocity w to impart on the rotating sphere given an arbitrary Control Axis will be derived. In the Control Axis that value w is given to mean the desired change in angular velocity. The linear velocity l of a point on a sphere is its angular velocity times the distance of the point from the axis. This distance is the radius of a cross section of the sphere that is orthogonal to the axis of rotation. The cross section is a circle with a radius i. FIG. 7 illustrates three cross sections of a sphere with origin along the axis of rotation. The cross sections are orthogonal to the axis of rotation, where the radius i of a cross-section h from the center of the sphere is $i = \sqrt{r^2 - h^2}$ ($-r \leq h \leq r$).

If the distance of the cross section is h from the center of the sphere, then using the Pythagorean Theorem, the distance, i, from the axis of rotation is given as $$i = \sqrt{r^2 - h^2}$$

Here r is the radius of the sphere. Since the rotational velocity a is the same for all point on the sphere, this gives the linear velocity l of any point on the surface of the sphere as $$l = i\omega = \omega \sqrt{r^2 - h^2}$$

Given an axis of rotation given by the Control Axis, the next step is to determine the h value for each vertex. The vertex can be said to be a point on the circle formed by the orthogonal cross section at h (See FIG. 7). The value h can be determined by finding the length of the projection of the vertex's position vector V onto the Control Axis which is designated as u. The next step is to look at the vertex position on the unit sphere. Therefore, the unit Vector V is used.

The length of the unit projection h' of V onto u will be the dot product of V and u $$h' = V \cdot u$$

This will give us the factor for the height of the vertex above or below the center of the sphere. The actual height h of the vertexes must be multiplied by r.

$$h = rh'$$

For the four vertexes of the primary tetrahedron, the h values are (in terms of the Control Axis a, b, c) as follows.

$$h'_\alpha = V_\alpha \cdot u = [(0)(a) + (0)(b) + (1)(c)] = c$$

$$h'_\beta = V_\beta \cdot u = \left[(0)(a) + \left(\frac{2\sqrt{2}}{3}\right)(b) + \left(-\frac{1}{3}\right)(c)\right] = \frac{2\sqrt{2}\,b - c}{3}$$

$$h'_\gamma = V_\gamma \cdot u$$
$$= \left[\left(-\frac{\sqrt{2}}{\sqrt{3}}\right)(a) + \left(-\frac{\sqrt{2}}{3}\right)(b), +\left(-\frac{1}{3}\right)(c)\right]$$
$$= -\frac{\sqrt{6}\,a + \sqrt{2}\,b + c}{3}$$

$$h'_\delta = V_\delta \cdot u$$
$$= \left[\left(\frac{\sqrt{2}}{\sqrt{3}}\right)(a) + \left(-\frac{\sqrt{2}}{3}\right)(b) + \left(-\frac{1}{3}\right)(c)\right]$$
$$= \frac{\sqrt{6}\,a - \sqrt{2}\,b - c}{3}$$

For the four vertexes of the prime tetrahedron, these values are as follows.

$$h'_{\alpha'} = V_{\alpha'} \cdot u = [(0)(a) + (0)(b) + (-1)(c)] = -c$$

$$h'_{\beta'} = V_{\beta'} \cdot u = \left[(0)(a) + \left(-\frac{2\sqrt{2}}{3}\right)(b) + \left(\frac{1}{3}\right)(c)\right] = -\frac{2\sqrt{2}\,b - c}{3}$$

$$h'_{\gamma'} =$$
$$V_{\gamma'} \cdot u = \left[\left(\frac{\sqrt{2}}{\sqrt{3}}\right)(a) + \left(\frac{\sqrt{2}}{3}\right)(b), \left(\frac{1}{3}\right)(c)\right] = \frac{\sqrt{6}\,a + \sqrt{2}\,b + c}{3}$$

$$h'_{\delta'} = V_{\delta'} \cdot u$$
$$= \left[\left(-\frac{\sqrt{2}}{\sqrt{3}}\right)(a) + \left(\frac{\sqrt{2}}{3}\right)(b) + \left(\frac{1}{3}\right)(c)\right]$$
$$= -\frac{\sqrt{6}\,a - \sqrt{2}\,b - c}{3}$$

Therefore the linear velocities for the eight vertices of the prototype configuration are given by $$l = i\omega = \omega\sqrt{r^2 - h^2} = \omega\sqrt{r^2 - (rh')^2} = r\omega\sqrt{1 - h'^2}$$

So that $$l_\alpha = r\omega\sqrt{1 - c^2}$$

$$l_\beta = r\omega\sqrt{1 - \left(\frac{2\sqrt{2}\,b - c}{3}\right)^2}$$

$$l_\gamma = r\omega\sqrt{1 + \left(-\frac{\sqrt{6}\,a + \sqrt{2}\,b + c}{3}\right)^2}$$

$$l_\delta = r\omega\sqrt{1 - \left(\frac{\sqrt{6}\,a - \sqrt{2}\,b - c}{3}\right)^2}$$

and $$l_{\alpha'} = r\omega\sqrt{1 - (-c)^2}$$

$$l_{\beta'} = r\omega\sqrt{1 - \left(-\frac{2\sqrt{2}\,b - c}{3}\right)^2}$$

$$l_{\gamma'} = r\omega\sqrt{1 - \left(\frac{\sqrt{6}\,a + \sqrt{2}\,b + c}{3}\right)^2}$$

$$l_{\delta'} = r\omega\sqrt{1 - \left(-\frac{\sqrt{6}\,a - \sqrt{2}\,b - c}{3}\right)^2}$$

Notice that the following relations are true.

$l_m = l_{m'}$ where $m = \alpha, \beta, \gamma,$ and $\delta$.

This gives the amount of change in linear velocity to impart to the rotor 102 at each vertex for any control quaternion in terms of the given desired change in rotational velocity and the axis of rotation. If the radius is given in centimeters and ω is given in rad/sec, then the conversion works out to cm/s.

This section has been about the geometry of the outer sphere and some of the more generic mathematics surrounding the embedded tetrahedrons inside a sphere and cube. The next section begins the discussion of the specific implementation of the prototype eight (8) vertex configuration reaction sphere and the geometry of the sensors at each vertex.

Part 2: Implementation Theory

Geometry of the Vertex Sensors

In this section the sensor set and the relationship of the magnetic sensors 112 around each vertex are described. The assembly will consist of an inner sphere (the rotor 102) which will have an even number of permanent magnets 108 arranged around it in evenly spaced antipodal pairs. The maximum number of permanent magnets is dictated by the field of view of the hall effect sensors 112. The magnets must be far enough apart that no sensor pod can detect more than one permanent magnet at any given time. This sphere 102 will be suspended within an outer spherical "cage" (the stator cage 104), to which electromagnets and sensor pods will be attached in antipodal pairs. The prototype will have four (4) sensor "pods" and eight electromagnets arranged into the two tetrahedrons described in "Geometry of the Outer Sphere". The "lower" tetrahedron (with the apex oriented in the +z direction) will consist of the primed vertex points and the "upper" tetrahedron (with the apex oriented in the −z direction) will consist of the unprimed vertex points.

Figure 8:
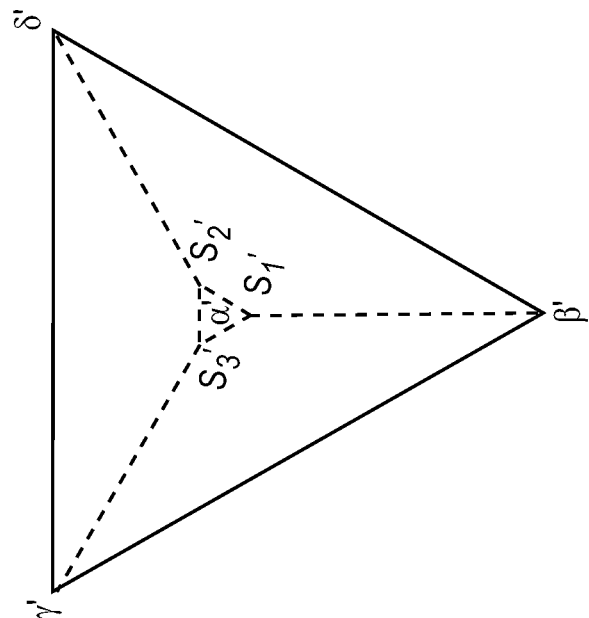
FIG. 8 illustrates each vertex of the upper tetrahedron will have a ring of sensors arranged about it equilaterally along with an electromagnet.
Figure 8:
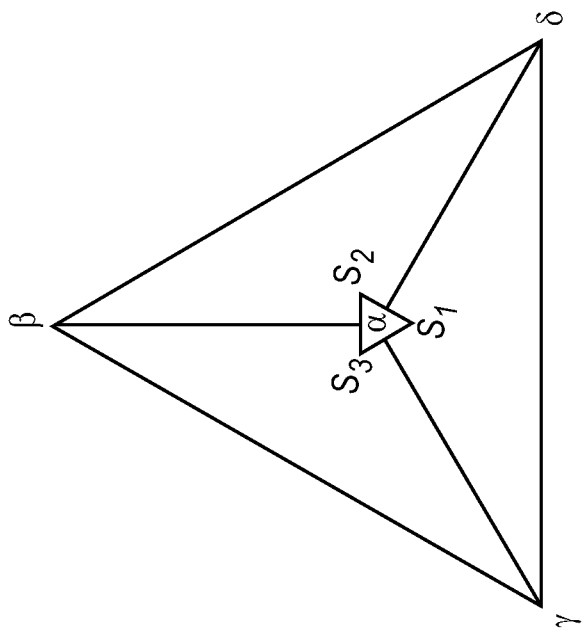

As shown in FIG. 8 each vertex will have a ring of sensors 112 arranged about it equilaterally along with an electromagnet 110. These sensors will be present only at the vertices of the upper tetrahedron. The lower tetrahedron will not have sensor pods, and will only have electromagnets.

The diagrams in FIG. 8 represent the vertices of the two tetrahedrons as seen from above the alpha vertex (looking down the z axis). The lower tetrahedron is upside-down. At each vertex will be three sensors 112 that will detect the presence of inner sphere's 102 magnets 108 as they rotate into each sensor's 112 "field of view." The inner triangle on the left represents the position of the sensors ($S_1$, $S_2$, $S_3$) which will relate to the alpha vertex. The inner triangle on the right represents the position of the sensors ($S_1'$, $S_2'$, $S_3'$) which will relate to the alpha prime vertex (they are displayed as grayed out because the alpha prime vertex is hidden by the base of the lower tetrahedron). Notice that while the orientation of the lower tetrahedron is reversed to allow the vertices to diametrically oppose each other across the sphere housing, the sensors for the primed points are not. This is done so that control for the equivalent of six sensors at each vertex pair may be provided.

The only restriction this imposes on the orientation of the magnets of the inner sphere (the rotor 102) is that for each permanent magnet 108 on the rotor 102, there must be another permanent magnet 108 diametrically opposed on the other side of the rotor 102. To achieve magnetic levitation (which is optional), the outer sphere 114 must be magnetized with the same magnetic pole pointing in toward the center of the sphere. As in the previous embodiments, the permanent magnets on the rotor 102 must each have the same pole pointing outward.

The center of each electronic control module 106 "sensor pod" will host a small electromagnet 110 that is energized when certain sensors 112 detect the presence of a magnet on the rotor 102. Energizing the electromagnet 110 will cause the rotor 102 to accelerate in the correct direction as specified by the "Control Axis".

Because the magnets 108 embedded in the rotor 102 are also opposed, that means that each pair of opposed vertex pods as may be treated as one system. Either $S_1$ or $S_1'$ can be independently activated (across the sphere) and it will have the same effect as if six sensors 112 were all located hexagonally around the alpha electromagnet 110.

Figure 9:
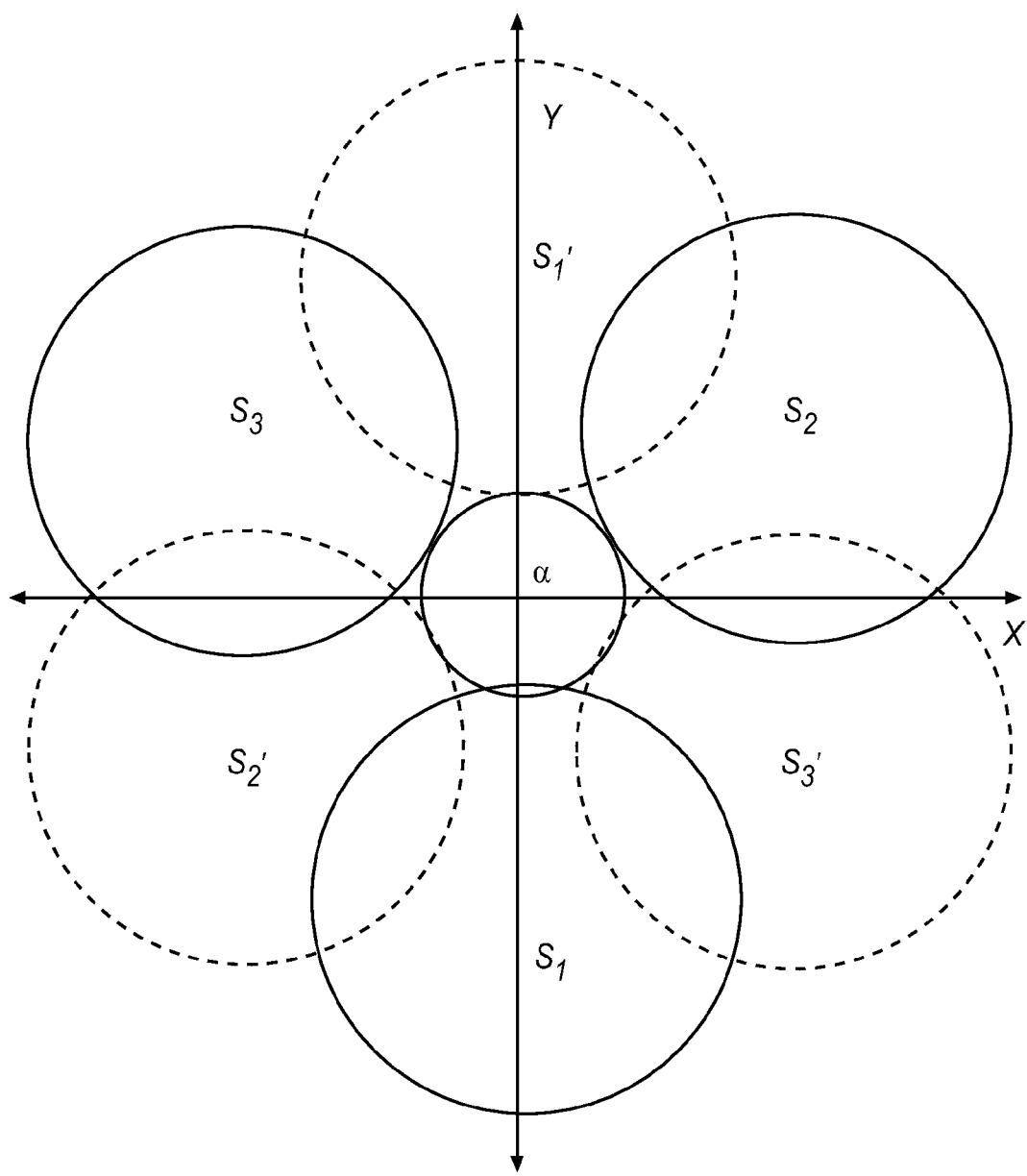
FIG. 9 illustrates intersecting fields of view for the sensor regions and represents the sensor configuration for any given vertex pair.

In the prototype configuration a ring of six (6) sensors 112 is used. FIG. 9 illustrates intersecting fields of view for the sensor regions and represents the sensor 112 configuration for any given vertex pair. The solid gray circles represent the field of view for the three sensors 112 related to the alpha vertex. Dotted circles represent the sensor field of view for the sensors 112 related to the alpha prime vertex. Actual position of the virtual sensor is across the sphere and directly opposed to the sensor 112 as indicated here.

The fields of view can be shaped so that there is a regular distribution across all sensors 112. The idea is to make the area in each sensor 112 act like a slice of the overall area around the electromagnet 110 so that the combination of two adjacent sensors 112, such as $S_1$ and $S_3'$, can produce its own directional area ($S_{13'}$). That way there can be twice as many possible degrees of motion as there are sensors.

Wedges can be inscribed onto the circles that represent the field of view for the sensors. If the sensor's field of view is a circle of radius f, then the inscribed wedge will have radius 2f.

Figure 10A:
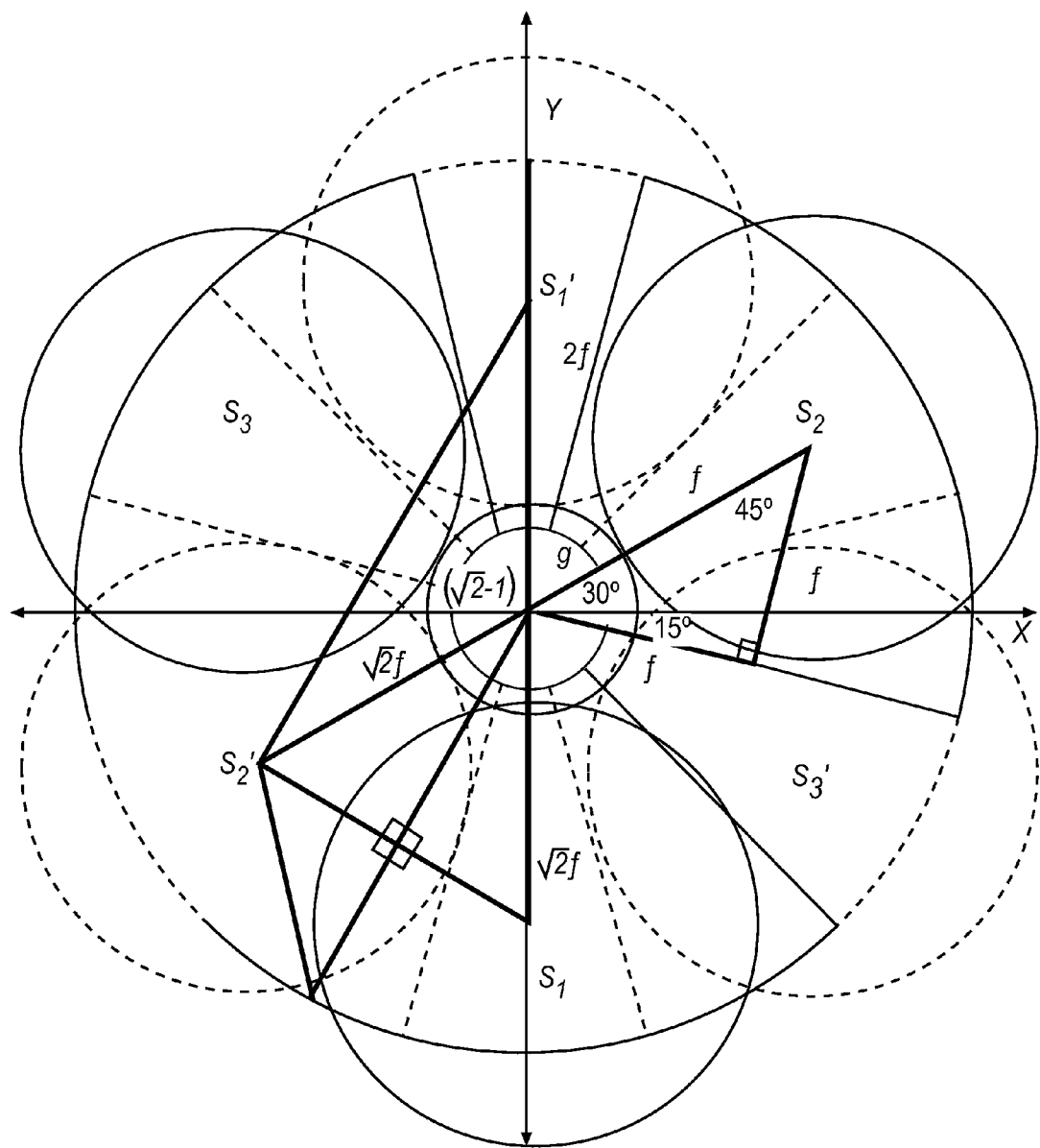
FIGS. 10A and 10B illustrate a method used to inscribe the wedges onto the six (6) sensor circles in a prototype configuration, showing the geometry of the sensor fields of view.
Figure 10B:
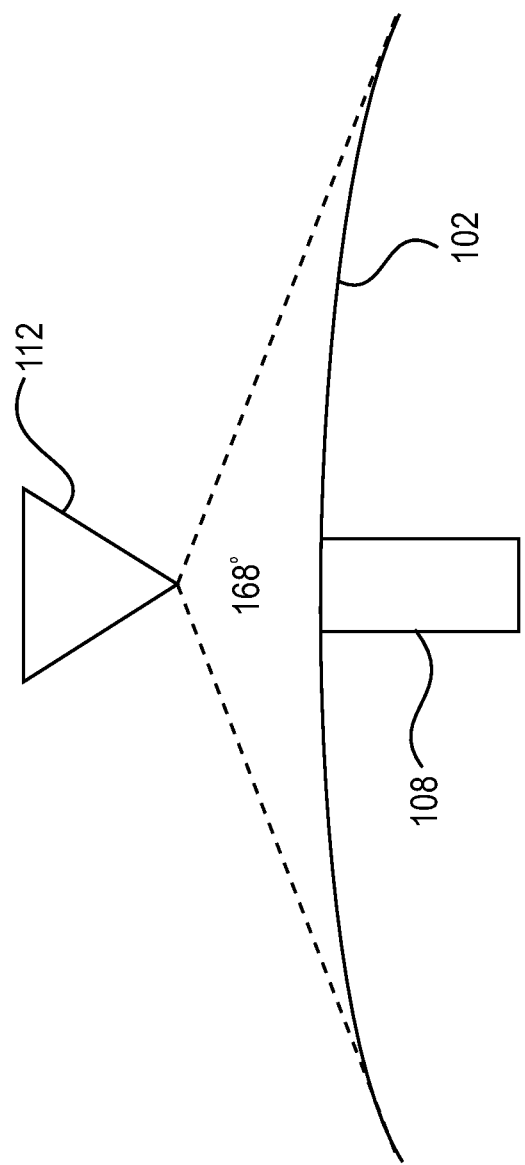

FIGS. 10A-10B illustrates a method used to inscribe the wedges onto the six (6) sensor circles in the prototype configuration, showing the geometry of the sensor fields of view.

In the prototype configuration, the angle at the apex of the wedge encompassing the field of view of one sensor will be 90°, the distance to the center of the sensor field of view is $$g + f = \sqrt{f^2 + f^2} = \sqrt{2f^2} = \sqrt{2}f$$

Note that the angle is determined by the following analysis. Three equal angles θ plus another three equal angles φ equal 360°. Which equates to 3θ+3φ=360°. Additionally θ=3φ. Substituting this for φ in the previous equation produces 3θ+θ=360°. Which reduces to 4θ=360°. Which means θ=90°.

Then the radius of g will be $$g = \sqrt{2}f - f = (\sqrt{2} - 1)f$$

The distance between the sensor points of the three co-located sensors 112 should be equilateral and based on the radius from the center of the system to the center of the sensor 112. The angle between two co-located sensors 112 is 120°. Using the law of cosines one can derive the distance between sensor centers.

$$\sqrt{2f^2 + 2f^2 - 4f^2 \cos(120°)} = \sqrt{4f^2 \left(1 - \left(-\frac{1}{2}\right)\right)}$$

$$= 2f\sqrt{\frac{3}{2}}$$

$$= 2\frac{\sqrt{3}}{\sqrt{2}}f$$

$$= \sqrt{6}\,f$$

Since the sensors are equilaterally spaced, the distance from the center point of a sensor to the adjacent sensor is $$\sqrt{2}f$$

and half that value marks the width of one wedge at its widest point.

$$\frac{\sqrt{2}}{2}f = \frac{1}{\sqrt{2}}f$$

Implementation

This section describes the specific geometry of the prototype configuration.

Assuming the distance in diameter between opposite sensors on the sensor pod is 1.4224 cm (0.56"), the distance from the center to one sensor is calculated as 0.7112 cm (0.28"). Then f becomes $$\frac{0.7112 \text{ cm}}{\sqrt{2}} = 0.503 \text{ cm} = f$$

and $$g = 0.208 \text{ cm}$$

The distance between adjacent sensors is 0.7112 cm (0.28") and the distance between co-located sensors is 1.006 cm (0.396").

If the standoff b between the ball and the sensor is 1.5 mm (0.059"), then the sensor's field of view angle θ needs to be a little more than 168 degrees.

$$\theta = \left(\pi - \tan^{-1}\frac{b}{f}\right) = 168°$$

Figure 11:
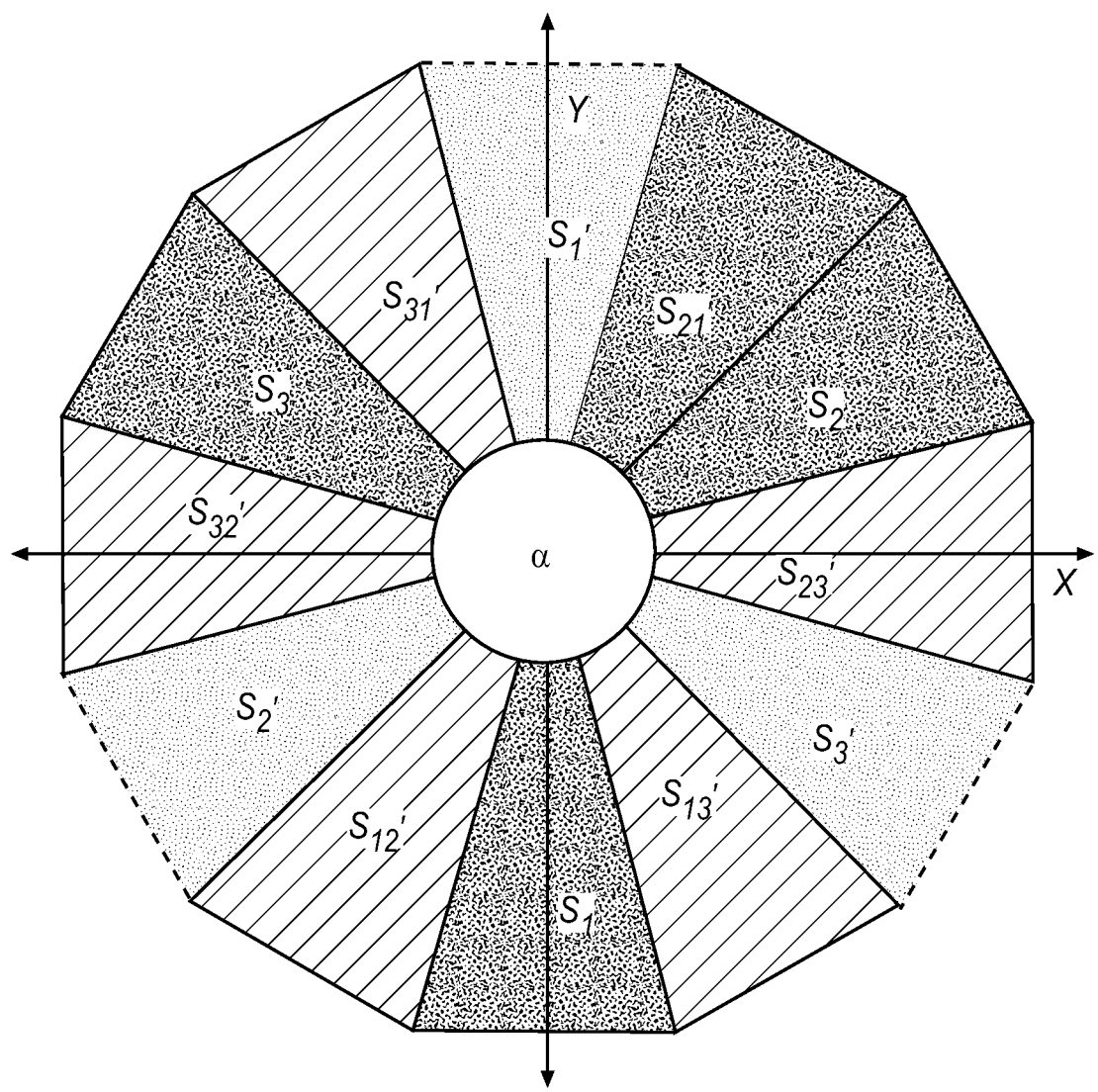
FIG. 11 illustrates sensor wedges for intersecting fields of view.

This creates twelve regions around the vertex each of 30° and each region represents a slice of either one sensor alone, or the intersection of two sensors 112. FIG. 11 illustrates sensor wedges for intersecting fields of view and extrapolates this concept further.

FIG. 11 shows the layout and shape of the sensor field of view for the given configuration. The angle of the field of view for each sensor is 90°. The different colors mentioned are illustrated in this figure and other figures with different hatchings or speckling. The blue areas indicate the fields of view for sensors $S_1$, $S_2$, and $S_3$. The reddish area represents the virtual field of view for $S_1'$, $S_2'$, and $S_3'$ respectively. Purple areas represent the points at which the local and virtual fields of view intersect each other. To get $S_1$ the controller must detect a magnet in $S_1$, and not in $S_2'$ or $S_3'$. To get the area between $S_2$ and $S_3'$ ($S_{23'}$) the controller must detect the magnet in $S_2$ and $S_3'$ simultaneously. So, the controller 106 will need to activate either three sensors 112 or two sensors 112 in order to detect in 12 directions.

Figure 12:
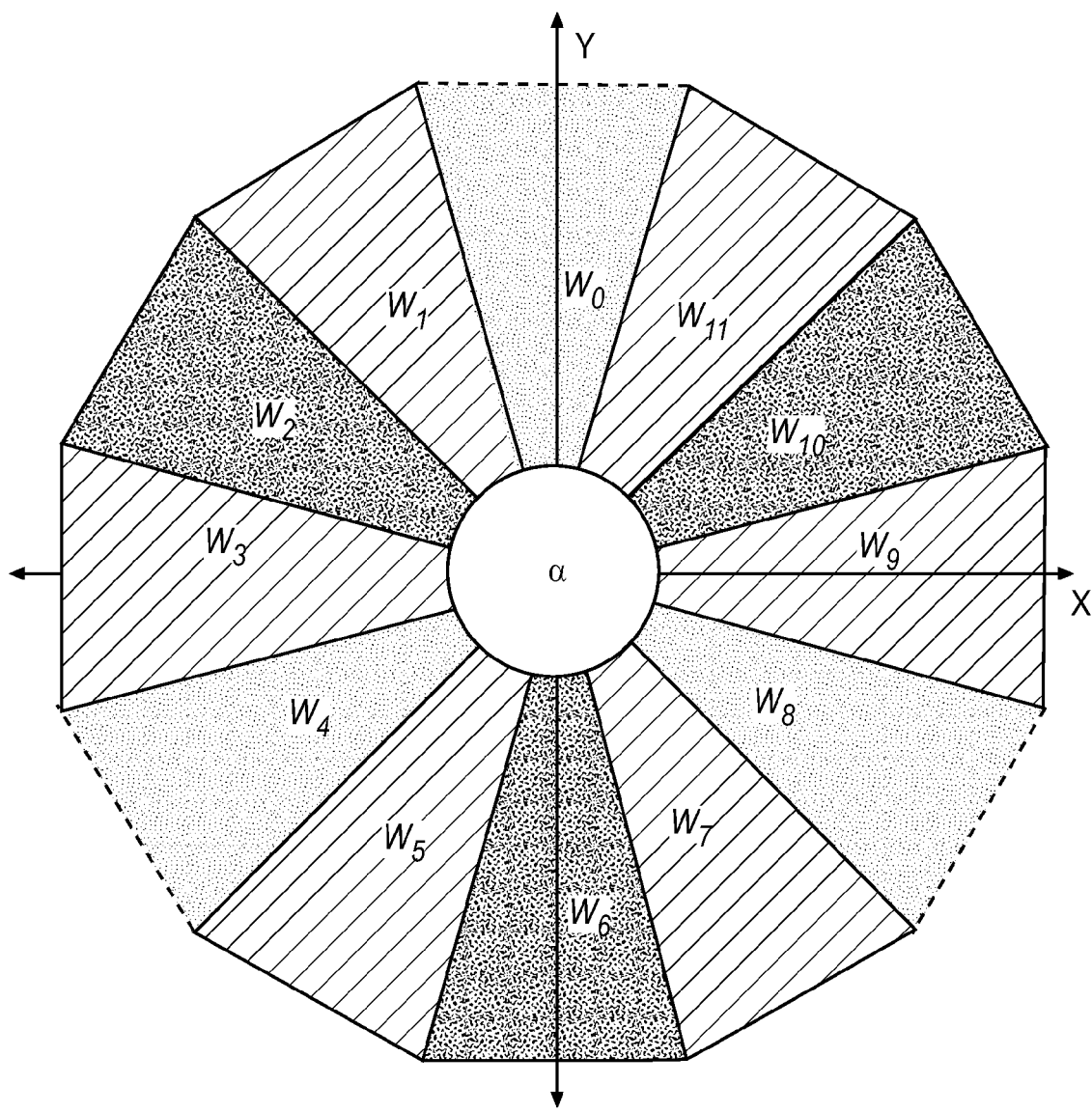
FIG. 12 illustrates re-designated sensor wedges for intersecting fields of view.

It will continue to be difficult to refer to each wedge in terms of the sensors to which it is related. Therefore, the wedges are numbered starting with the $S_{23'}$ wedge as $W_0$ and continuing counter clockwise around the circle until reaching $W_{11}$. This is shown in FIG. 12, which illustrates re-designated sensor wedges for intersecting fields of view.

An optional "Cutout" restricting the sensor's field of view at each sensor point will be three wedges cut from a circle with radius of $$2f$$

Figure 13:
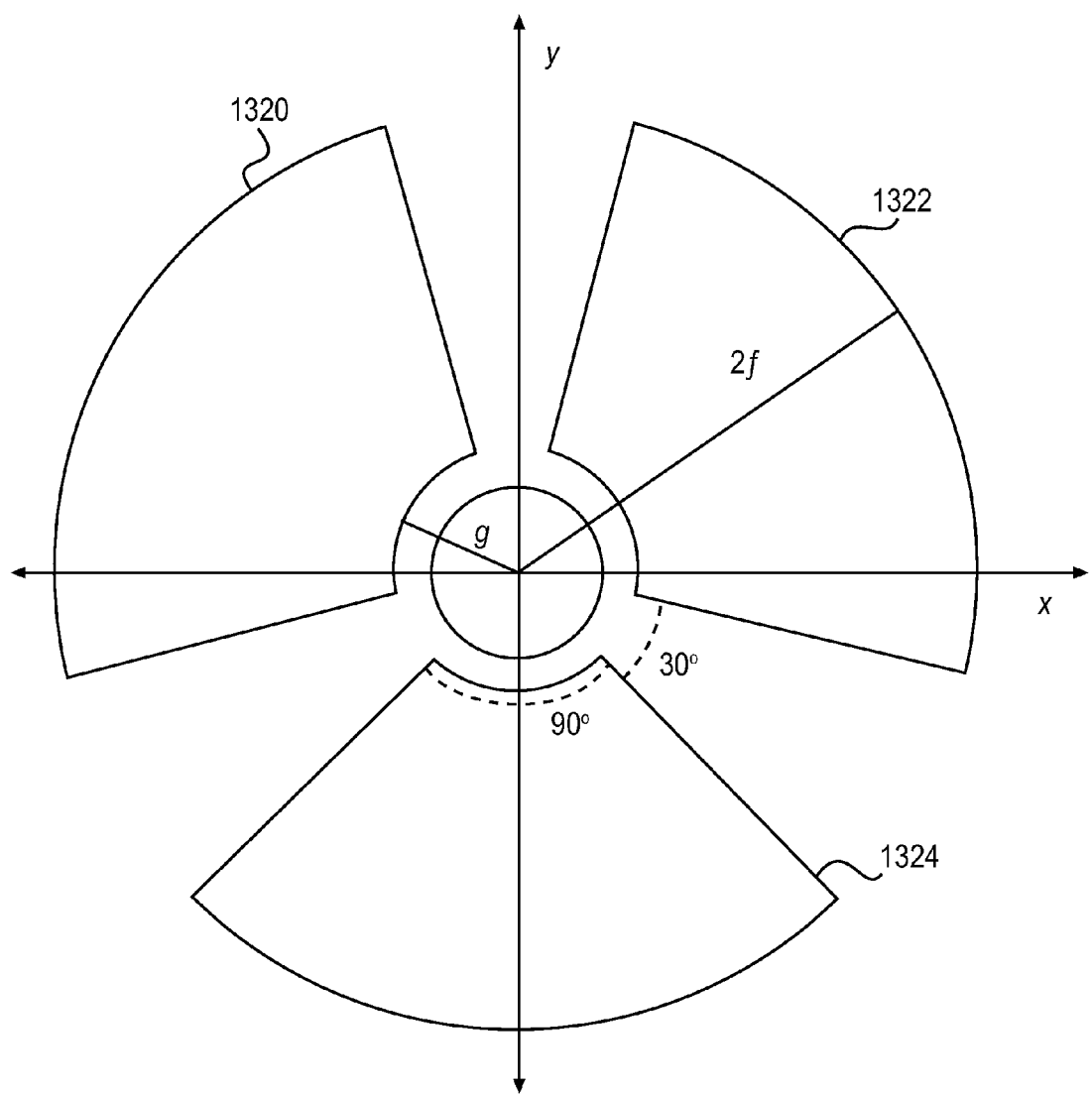
FIG. 13 illustrates field of view cutouts for the prototype configuration's sensors and electromagnet.

The angle of each wedge will be 90° and they will be spaced 30° apart from each other around the circle. There is an inner circle representing the electromagnet 110 at this given vertex point. The radius of this circle is g and it must be large enough to accommodate the radius of the electromagnet 110. FIG. 13 illustrates field of view cutouts 1320, 1322, 1324 for the prototype configuration's sensors 112 and electromagnet 110.

Figure 14:
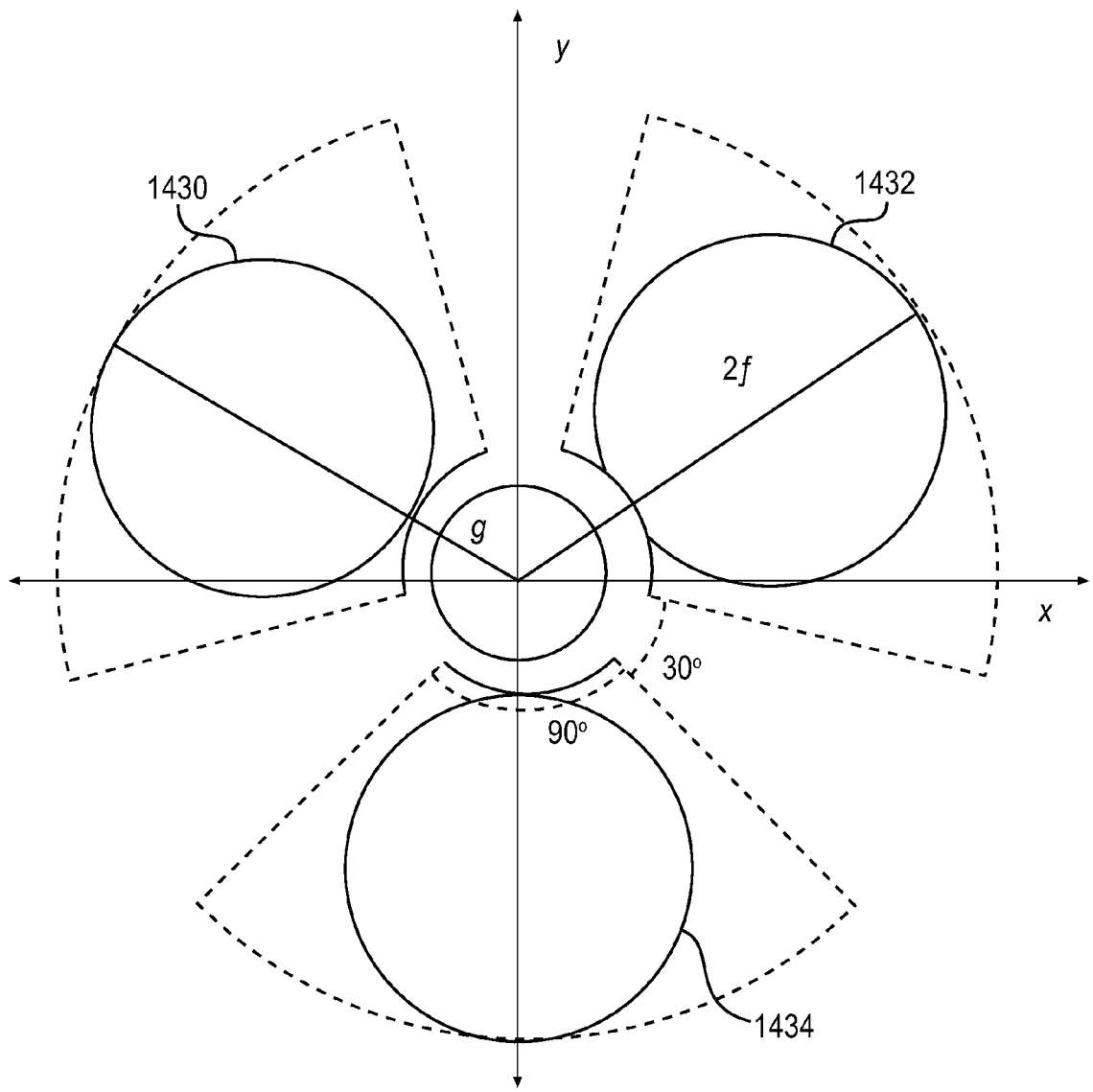
FIG. 14 illustrates alternate fields of view using simple drill holes.

Three small circles inscribed in each wedge may be used in place of the wedges to reduce the area removed from the outer sphere, and to make the sensor holes easier to drill. However this will also increase the chance of getting a "miss" from the spinning sphere. FIG. 14 illustrates alternate fields of view using simple drill holes 1430, 1432, 1434.

In each of these diagrams note that the inner circle is of radius g. This value should represent the radius of the electromagnet. The diameter of the inscribed circles will be $$(1-\sqrt{2})f$$

What is described here, using its own internal geometry, is the structure of the sphere at each vertex αβγδ as described in the "Geometry of the Outer Sphere". Each vertex has been defined in terms of a plane tangent to the sphere at that point in space and, as defined in Basis at Each Vertex the plane has been assigned a pair of basis vectors representing the coordinate space of the plane with the vertex at its origin. These basis vectors allow us to define a two dimensional x-y Cartesian coordinate space for the sensors that will allow us to perform control operations based on impulses received from the sensors 112. The impulses occur when a permanent magnet 108 in an embodiment crosses a sensor's 112 field of view.

The next step is to determine which control sensors 112 to activate under which conditions in order to achieve the direction of motion as specified by the "Control Axis". A first step is to determine, based on the angle of the desired direction of rotation, which wedge sections the direction of rotation is over. From that it is next determined which sensors 112 to activate. Activating a sensor 112 will, when the sensor 112 detects the presence of a magnet 108, energize the electromagnet 110, thereby pulling the rotor 102 rotation toward the origin. The wedge sensors 180° opposed to the desired direction of rotation will need to be activated.

Determination of the Control Wedge

Figure 15:
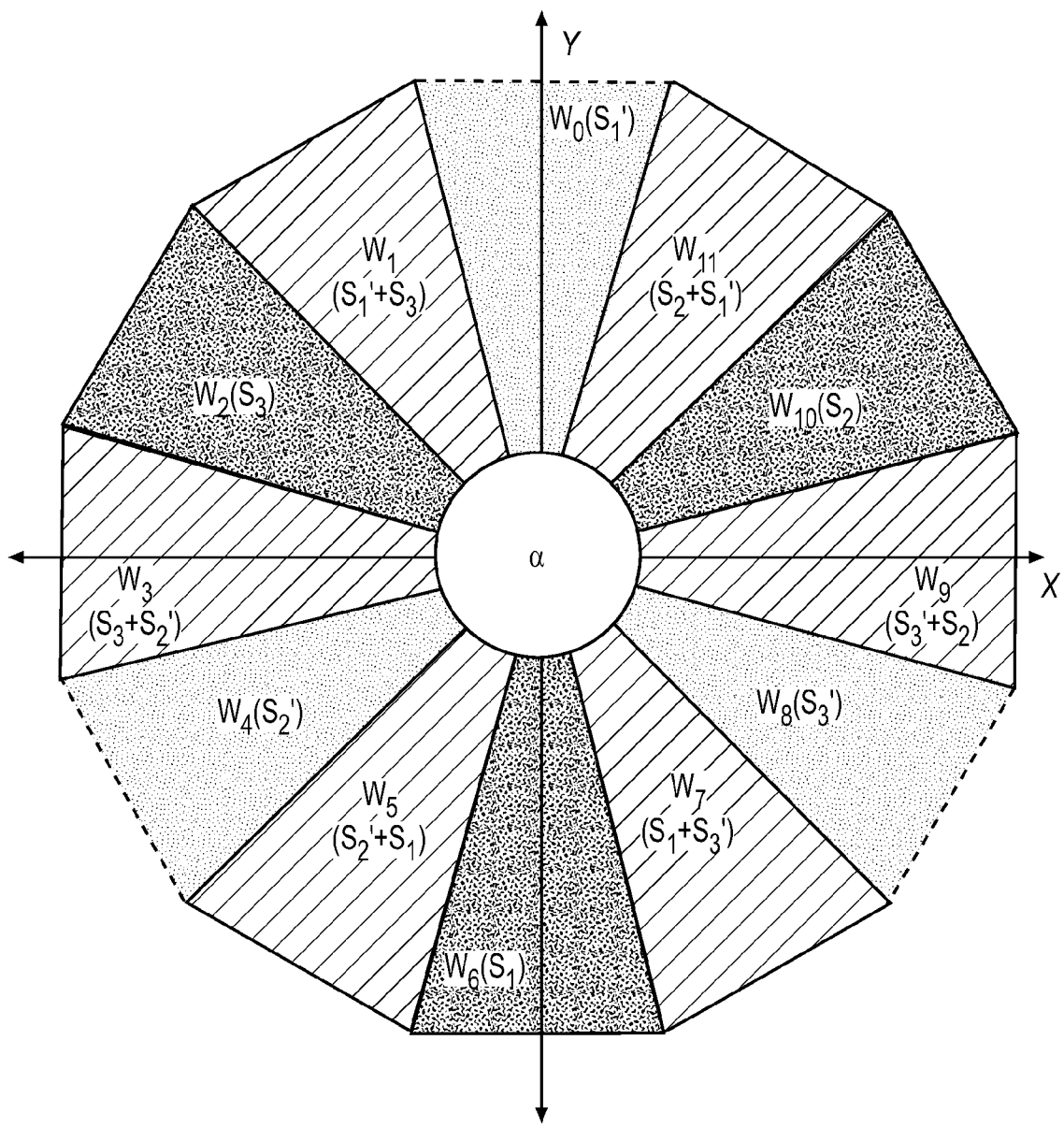
FIG. 15 illustrates sensor wedges for intersecting fields of view and describes twelve (12) control regions that coincide with one of 6 sensors arranged at each vertex around an embodiment of the spherical motor system.

In the section named "Geometry of the Vertex Sensors", the control area using the diagram shown in FIG. 15 was described. FIG. 15 illustrated sensor wedges for intersecting fields of view. FIG. 15 describes twelve (12) control regions that coincide with one of 6 sensors arranged at each vertex around an embodiment of the spherical motor system. The origin of this coordinate system corresponds to one of the 4 vertices of the sensor tetrahedron as described in "Geometry of the Outer Sphere". The plane of the coordinate system is tangent to an embodiment of the spherical motor system, with the z axis pointing out of the page and intersecting the origin (center) of an embodiment of the spherical motor system. The orientation of the x and y axis is dependent on the sensor vertex and is described in Basis at Each Vertex.

In "Projection of Directional Vectors", the (x, y) coordinates of the Control Axis in the coordinate space described above is calculated. The next task is to determine the control wedge in which the given control vector lies. To do that the inverse tan( ) function($\tan^{-1}$) is used $$\tan^{-1}\left(\frac{y}{x}\right)$$

Which returns the angle of the vector given by (x, y). Assuming the angles will be returned in radians. Since $$T = \frac{y}{x}$$

then the following reductions for the prototype configuration are possible from the equations given in "Projection of Directional Vectors".

$$T_\alpha = \frac{U'_\alpha(y)}{U'_\alpha(x)}$$
$$= \frac{-a}{b}$$

$$T_\beta = \frac{U'_\beta(y)}{U'_\beta(x)}$$
$$= \frac{3a}{-(b+2\sqrt{2}\,c)}$$

$$T_\gamma = \frac{U'_\gamma(y)}{U'_\gamma(x)}$$
$$= \frac{\frac{a}{2} - \frac{\sqrt{3}\,b}{2}}{-\frac{1}{6}(\sqrt{3}\,a + b - 4\sqrt{2}\,c)}$$
$$= \frac{3(a - \sqrt{3}\,b)}{-(\sqrt{3}\,a + b - 4\sqrt{2}\,c)}$$

$$T_\delta = \frac{U'_\delta(y)}{U'_\delta(x)}$$
$$= \frac{\frac{a}{2} + \frac{\sqrt{3}\,b}{2}}{\frac{1}{6}(\sqrt{3}\,a - b + 4\sqrt{2}\,c)}$$
$$= \frac{3(a + \sqrt{3}\,b)}{\sqrt{3}\,a - b + 4\sqrt{2}\,c}$$

$$T_{\alpha'} = \frac{U'_{\alpha'}(y)}{U'_{\alpha'}(x)}$$
$$= \frac{a}{b}$$

$$T_{\beta'} = \frac{U'_{\beta'}(y)}{U'_{\beta'}(x)}$$
$$= \frac{3a}{b + 2\sqrt{2}\,c}$$

$$T_{\gamma'} = \frac{U'_{\gamma'}(y)}{U'_{\gamma'}(x)}$$
$$= \frac{-\left(\frac{a}{2} - \frac{\sqrt{3}\,b}{2}\right)}{\frac{1}{6}(\sqrt{3}\,a + b - 4\sqrt{2}\,c)}$$
$$= \frac{3(a - \sqrt{3}\,b)}{\sqrt{3}\,a + b - 4\sqrt{2}\,c}$$

$$T_{\delta'} = \frac{U'_{\delta'}(y)}{U'_{\delta'}(x)}$$
$$= \frac{-\left(\frac{a}{2} + \frac{\sqrt{3}\,b}{2}\right)}{\frac{1}{6}(\sqrt{3}\,a - b + 4\sqrt{2}\,c)}$$
$$= \frac{-3(a + \sqrt{3}\,b)}{\sqrt{3}\,a - b + 4\sqrt{2}\,c}$$

Note that the r terms from the directional vector projections reduce out of the given relationships, leaving the ratios entirely in terms of the components of the Control Axis.

Given the results of the above equations, the wedge can be determined using the following table. This table will have to be refactored if the configuration of the sensors 112 changes. The table contains angle values from 0 to $2\pi$ (which is in the middle of the $W_9$ wedge). Therefore $W_9$ is represented both at the beginning and end of the table.

TABLE 6

Wedge determination based on desired angle reference

| Direction | Activate If | Angle (radians) | Ref |
|---|---|---|---|
| $W_9$ | $S_2' + S_3$ | 0.0 | 0 |
| $W_9$ | $S_2' + S_3$ | 0.26179938779914943653855361527329 | $\frac{\pi}{12}$ |
| $W_{10}$ | $S_2' + \sim S_1 + \sim S_3$ | 0.78539816339744830961566084581988 | $\frac{\pi}{4}$ |
| $W_{11}$ | $S_2' + S_1$ | 1.3089969389957471826927680763665 | $\frac{5\pi}{12}$ |

TABLE 6-continued

Wedge determination based on desired angle reference

| Direction | Activate If | Angle (radians) | Ref |
|---|---|---|---|
| $W_0$ | $S_1 + \sim S_2' + \sim S_3'$ | 1.8325957145940460557698753069130 0 | $\frac{7\pi}{12}$ |
| $W_1$ | $S_1 + S_3'$ | 2.3561944901923449288469825374596 | $\frac{3\pi}{4}$ |
| $W_2$ | $S_3' + \sim S_2 + \sim S_1$ | 2.8797932657906438019240897680062 | $\frac{11\pi}{12}$ |
| $W_3$ | $S_2 + S_3'$ | 3.4033920413889426750011969985528 | $\frac{13\pi}{12}$ |
| $W_4$ | $S_2 + \sim S_1' + \sim S_3'$ | 3.9269908169872415480783042290994 | $\frac{5\pi}{4}$ |
| $W_5$ | $S_1' + S_2$ | 4.4505895925855404211554114596 46 | $\frac{17\pi}{12}$ |
| $W_6$ | $S_1' + \sim S_2 + \sim S_3$ | 4.9741883681838392942325186901925 | $\frac{19\pi}{12}$ |
| $W_7$ | $S_1' + S_3$ | 5.4977871437821381673096259207391 | $\frac{7\pi}{4}$ |
| $W_8$ | $S_3, \sim S_1', \sim S_2'$ | 6.0213859193804370403867331512857 | $\frac{23\pi}{12}$ |
| $W_9$ | $S_2', S_3$ | 6.2831853071795864769252867665 59 | $2\pi$ |

Table 6 gives the values for the upper boundary of each directional wedge. The reference angle describes the true value of the wedge boundary in terms of pi. The "Direction" column indicates the wedge in which the "Control Axis" projection lies.

The "Activate If" column describes the conditions under which the vertex electromagnet should be energized in order to rotate the sphere in the proper direction. In this case the Sensors immediately aft of the given directional wedge are used to achieve the intended rotation. The tilde character (~) indicates that the sensor must NOT be active.

As an example, in order to achieve a rotation in the direction of $W_9$ the $S_1'$ sensor 112 must be active and $S_2$ and $S_3$ must both NOT be active. Then, when the electromagnet is energized it will pull the sphere in the $W_9$ direction. To pull the sphere in the $W_{10}$ direction both the $S_1'$ and $S_3$ sensors 112 must be active.

Imparting Momentum

Figure 16:
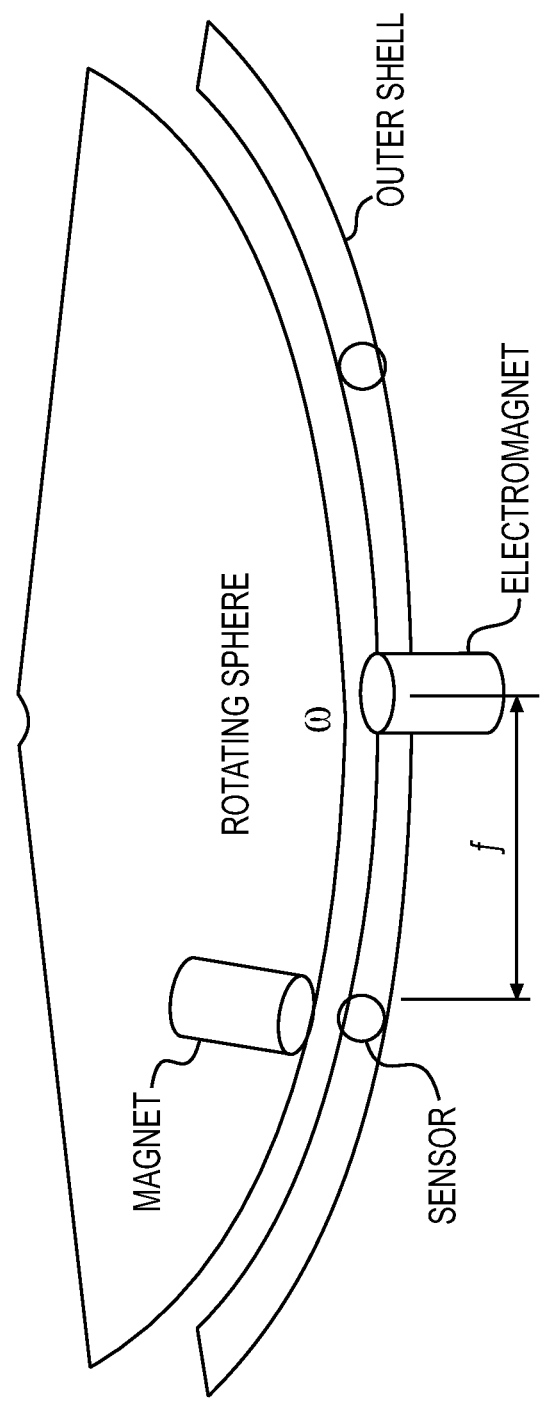
FIG. 16 illustrates the status of the rotor when a sensor detects the presence of a magnet.

When a sensor 112 detects the presence of an magnet 108 in a certain desired control wedge, the control system will energize the electromagnet 110 for a period of time, imparting momentum to the sphere 102 in nearly the desired direction. The electromagnet 110 is "pulsed" to transfer momentum either to or from the rotor in the desired vector. FIG. 16 illustrates the status of the rotor 102 when a sensor 112 detects the presence of a magnet 108.

To transfer momentum the electromagnet 110 is energized when the sensor 112 detects the presence of a permanent magnet on the rotor. Regardless of the direction the magnet 108 is currently going a rotational force will be applied to the rotor 102 until the magnet 108 has traveled the distance f. Then the electromagnet 110 will be deenergized. During this time period an average force of F is applied to the rotation of the rotor 102. The actual force will increase as f approaches 0. For now it is assumed that a constant average force applied of F. Given the mass of the rotor 102 m, it can be determined that the acceleration dv applied to the rotor 102 in the direction from the sensor 112 to the electromagnet 110 as:

$$a = \frac{dv}{dt}$$
$$= \frac{F}{m}$$

This gives the change in linear velocity per electromagnet pulse (deltaV). The next parameter needed to make this work is the current linear speed of the rotor 102 $l_0$. This is used to compute the amount of time t that F will be applied.

$$t = \frac{l_0}{a}$$

Given this t, the momentum applied p to the rotor 102 in the given direction for each pulse can be calculated.

$$p = Ft = mat = ml_0$$

As the actual speed of the rotor 102 increases, the velocity that is imparted by a single electromagnetic pulse decreases. The next step is to apply the pulse a number of times n to the current speed of the rotor 102 in order to impart our desired velocity of l.

$$np = p_{total}$$

$$nml_0 = ml_{vertex}$$

Consequently, m divides out and n can be determined for each sensor pod. Note that $l_{\alpha 0}$ indicates the current speed of the ball at the alpha vertex $l_{\alpha 1}$ indicates the new commanded speed of the ball at the alpha vertex.

$$n_\alpha = \frac{l_{\alpha\,vertex}}{l_{\alpha 0}}$$

$$n_\beta = \frac{l_{\beta\,vertex}}{l_{\beta 0}}$$

$$n_\gamma = \frac{l_{\gamma\,vertex}}{l_{\gamma 0}}$$

$$n_\delta = \frac{l_{\delta\,vertex}}{l_{\delta 0}}$$

By energizing the electromagnet 110 a number of times n as each permanent magnet 108 is detected by the sensor 112, the desired momentum is transferred to or from the rotor 102.

By using only the sensors as described in the section titled "Determination of the Control Wedge" a momentum may be imparted with an accuracy of ±15°. The next step is to examine a way in which the accuracy of the control algorithm given the implementation described above can be increased.

Linear Combination of Applied Forces

The desired rotational angle for the imparted momentum is given in terms of the "Control Axis" by the following formulas as derived in the section named "Determination of the Control Wedge".

$$A_\alpha = \tan^{-1}(T_\alpha)$$
$$= \tan^{-1}\left(\frac{a}{b}\right)$$

$$A_\beta = \tan^{-1}(T_\beta)$$
$$= \tan^{-1}\left(\frac{3a}{b+2\sqrt{2}\,c}\right)$$

$$A_\gamma = \tan^{-1}(T_\gamma)$$
$$= \tan^{-1}\left(-\frac{3(a-\sqrt{3}\,b)}{\sqrt{3}\,a+b-4\sqrt{2}\,c}\right)$$

$$A_\delta = \tan^{-1}(T_\delta)$$
$$= \tan^{-1}\left(-\frac{3(a-\sqrt{3}\,b)}{-\sqrt{3}\,a+b-4\sqrt{2}\,c}\right)$$

$$A_{\alpha'} = \tan^{-1}(T_{\alpha'})$$
$$= \tan^{-1}\left(-\frac{a}{b}\right)$$

$$A_{\beta'} = \tan^{-1}(T_{\beta'})$$
$$= \tan^{-1}\left(-\frac{3a}{b+2\sqrt{2}\,c}\right)$$

$$A_{\gamma'} = \tan^{-1}(T_{\gamma'})$$
$$= \tan^{-1}\left(-\frac{3(a-\sqrt{3}\,b)}{\sqrt{3}\,a+b-4\sqrt{2}\,c}\right)$$

$$A_{\delta'} = \tan^{-1}(T_{\delta'})$$
$$= \tan^{-1}\left(-\frac{3(a-\sqrt{3}\,b)}{-\sqrt{3}\,a+b-4\sqrt{2}\,c}\right)$$

However, the given implementation is only capable of imparting momentum in 30° increments. Consequently, it is necessary to develop a way to increase the accuracy of the desired momentum imparted to the rotor 102.

The first thing to determine is the error by which the desired angle A differs from the angle at which W can be imparted. Since the control wedge in which the angle resides can be determined, it is known that the difference e between the angle of momentum imparted $W_n$ and the desired angle of momentum A is ±15°. The following formula will determine the error angle.

$$e_\alpha = A_\alpha - W_n$$
$$e_\beta = A_\beta - W_n$$
$$e_\gamma = A_\gamma - W_n$$
$$e_\delta = A_\delta - W_n$$
$$e_{\alpha'} = A_{\alpha'} - W_n$$
$$e_{\beta'} = A_{\beta'} - W_n$$
$$e_{\gamma'} = A_{\gamma'} - W_n$$
$$e_{\delta'} = A_{\delta'} - W_n$$

Note that $W_n$ is the angle as determined by the wedge found in section "Determination of the Control Wedge" for the given Angle A. Table 7 gives these angles.

TABLE 7

| Wedge | Angle |
|---|---|
| $W_9$ | 0 |
| $W_{10}$ | $\frac{\pi}{6}$ |
| $W_{11}$ | $\frac{\pi}{3}$ |
| $W_0$ | $\frac{\pi}{2}$ |
| $W_1$ | $\frac{2\pi}{3}$ |
| $W_2$ | $\frac{5\pi}{6}$ |
| $W_3$ | $\pi$ |
| $W_4$ | $\frac{7\pi}{6}$ |
| $W_5$ | $\frac{4\pi}{3}$ |
| $W_6$ | $\frac{3\pi}{2}$ |
| $W_7$ | $\frac{5\pi}{3}$ |
| $W_8$ | $\frac{11\pi}{6}$ |

Figure 17:
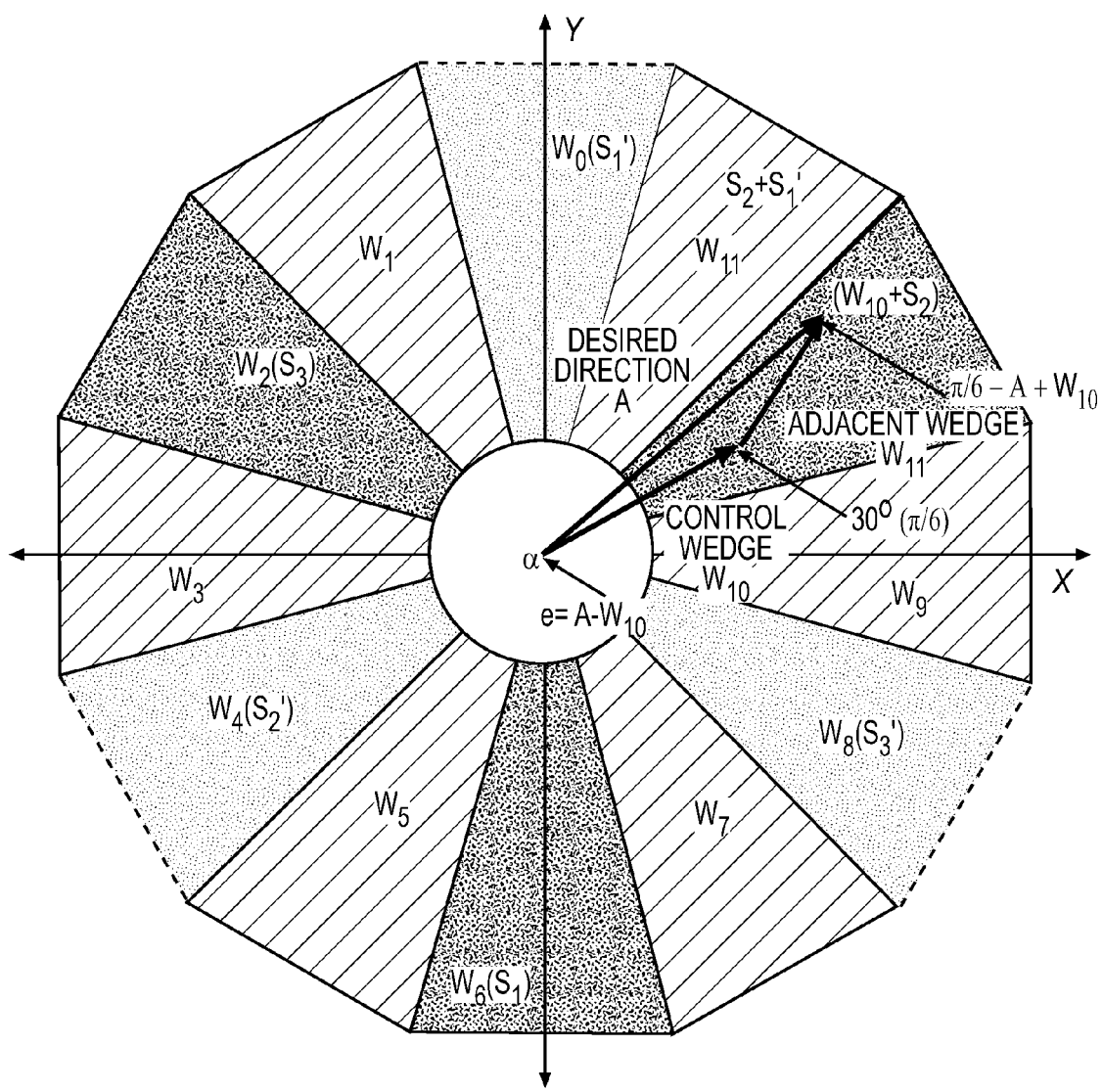
FIG. 17 illustrates a linear combination of vectors to achieve the desired directional momentum.

It is noted that the index n of $W_n$ time $\pi/6$ will give the angle of imparted momentum. FIG. 17 illustrates a linear combination of vectors to achieve the desired directional momentum.

Figure 18:
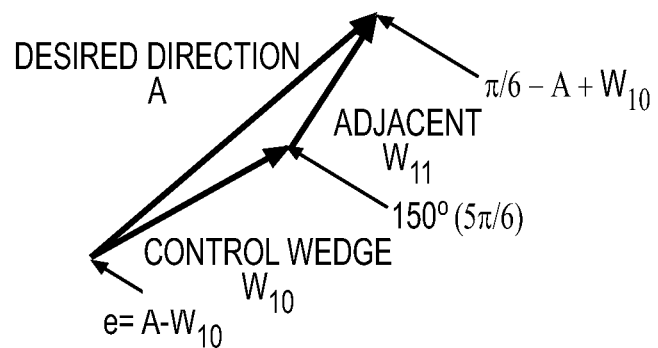
FIG. 18 illustrates that if the wedges are stripped (see FIG. 17), leaving only the vectors, the determination of the relationship between the vectors shown in FIG. 18 can be made.

If the wedges are stripped, leaving only the vectors, the determination shown in FIG. 18 can be made.

The ratio of the control wedge magnitude to adjacent wedge magnitude that will produce the desired angle offset e is determined. If it is assumed that the length of Desired Direction vector A is 1, and e is derived by subtracting the desired angle from the angle of the Control Wedge vector C, then this should be enough information to determine all aspects of the given triangle. This is because it is already known that the angle between the Control Wedge vector and the Adjacent Wedge vector D is 180°−30°=150°. That makes the third angle 180°−150°−e=30°−e. Using the law of sines this produces the following relationship.

$$\frac{A}{\sin\frac{5\pi}{6}} = \frac{C}{\sin\left(\frac{\pi}{6}-e\right)}$$
$$= \frac{D}{\sin e}$$

Since we've made the Desired Direction Vector of length 1, the C and D vectors become as follows.

$$C = \frac{\sin\left(\frac{\pi}{6}-e\right)}{\sin\frac{5\pi}{6}} = \beta\sin\left(\frac{\pi}{6}-e\right) \text{ where } \beta = \frac{1}{\sin\frac{5\pi}{6}} = 2$$

$$D = \frac{\sin e}{\sin\frac{5\pi}{6}} = \beta \sin e \text{ where } \beta = \frac{1}{\sin\frac{5\pi}{6}} = 2$$

Note that C will always produce a positive sin as long as $\pi/6 \geq e \geq -\pi/6$. A will always have the same sign as e. The denominator is a constant in both cases and the sine of $5\pi/6$ is the same as the sine of $\pi/6$, which is 0.5. The reciprocal of this is $\beta$ and is 2. A magnitude ratio for both the Control Wedge vector and the Adjacent Wedge vector and the sign of the Adjacent Wedge vector indicates which adjacent Wedge to use. What this gives us is the ability to determine how much force to apply in each direction to achieve a vector in the correct direction and with the correct magnitude.

Given a number of pulses n to obtain the desired momentum, the values above are used to determine the number of pulses to use in each wedge direction to produce the desired rotational direction.

$$n_C = 2n\sin\left(\frac{\pi}{6} - e\right)$$

$$n_D = 2n\sin e$$

The method of controlling the reaction sphere to a fairly fine degree is now defined, given our implementation.

Mapping the Wedge Designations onto the Control Pods

Figure 19:
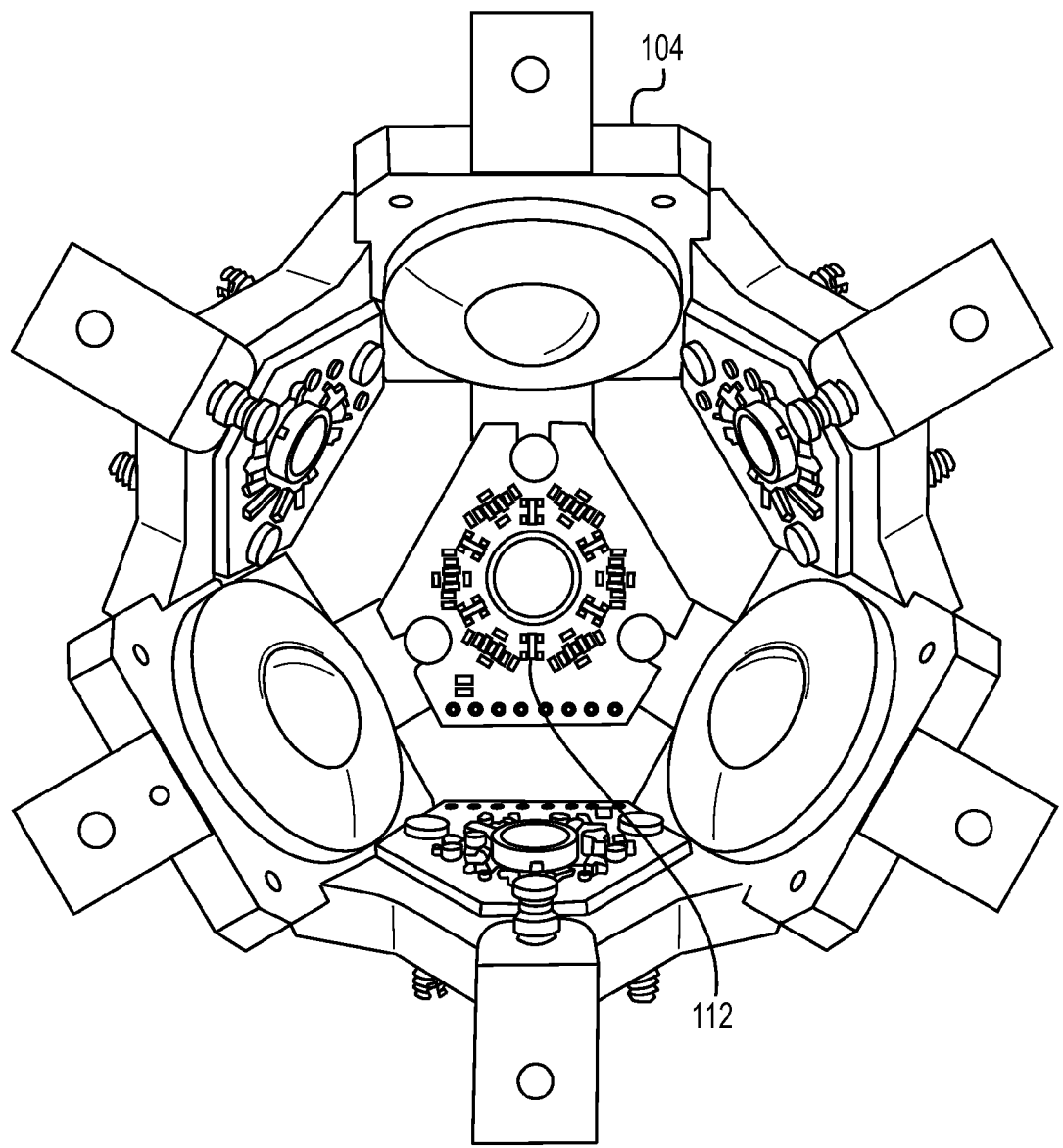
FIG. 19 illustrates the placement of the sensor pods in an embodiment of the stator cage.

FIG. 19 illustrates the placement of the sensor pods 112 in an embodiment of the stator 104 cage. Note that all four Sensor vertices are in the "top" half of the stator 104 cage. If the top vertex is designated as a, then the four other vertices are $\beta'$, $\gamma'$, and $\delta'$ respectively. This maps the sensor pods PWBs against the vertices described in the sections above. The next step is to map the actual sensors 112 onto the sensor designations given in the section above.

Figure 20:
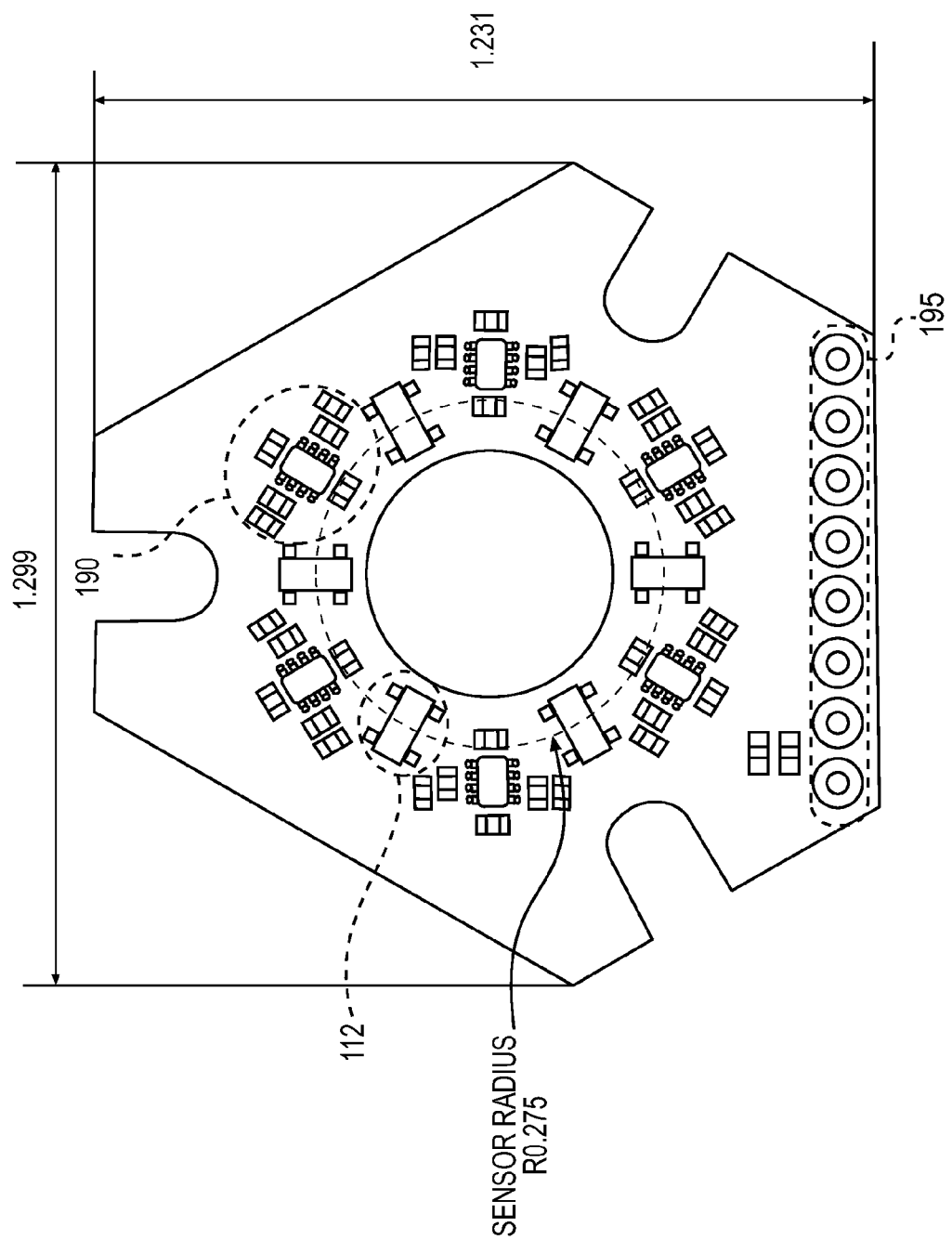
FIG. 20 illustrates the printed wiring board (PWB) design of the sensor pods.

FIG. 20 illustrates the PWB design of the sensor pods (e.g., hall effect sensors 112). Signal amplification circuitry (×6) 190 and wiring connections 195 to processing circuits are also illustrated. In every case the transformation of the coordinate axis will yield a sensor pod with the axis orientation as given below.

Determining the Speed of the Rotor at Each Vertex

Embodiments implement a method to determine the speed of the rotor 102 by reading the position of a magnet 108 at each sensor pod 112 (i.e., vertex). Reviewing the field of view pattern for the vertex sensors 112 developed in section "Geometry of the Vertex Sensors".

Figure 21:
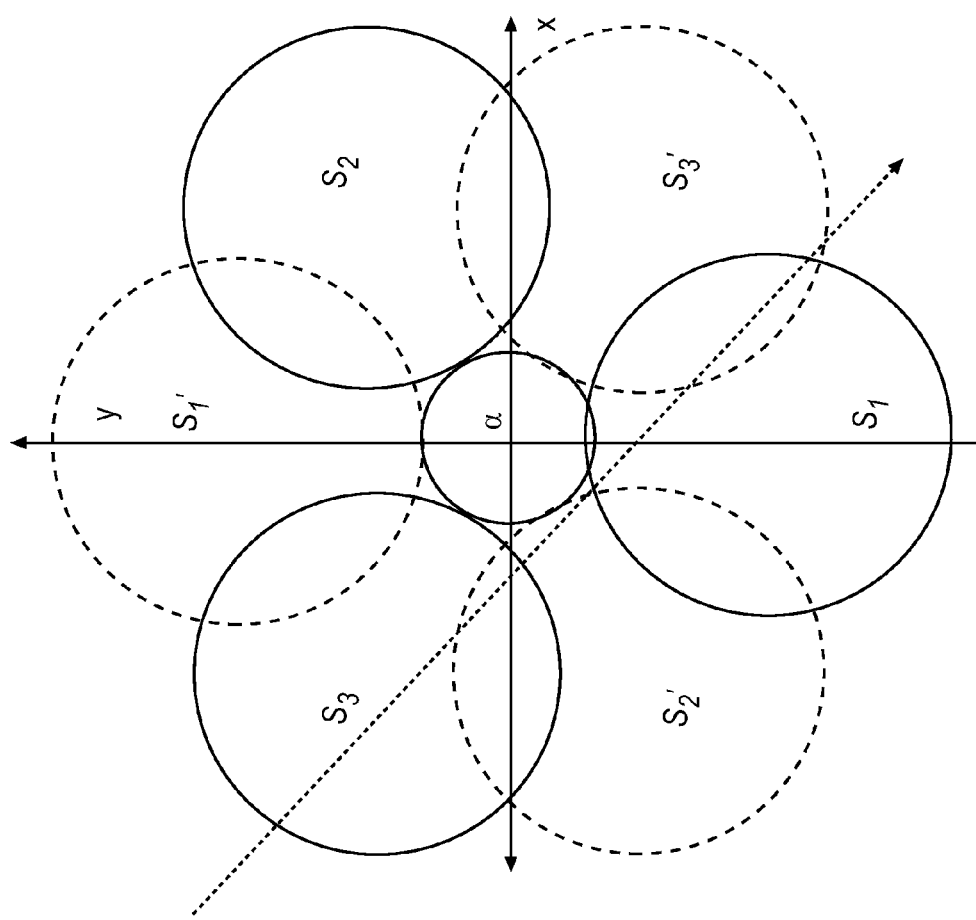
FIG. 21 illustrates the path of a magnet as it passes through the field of view of the vertex sensors.

The dashed arrow in FIG. 21 represents the path of a magnet 108 as it passes through the field of view of the vertex sensors 112. Assuming that the sensors 112 are time sampled as the magnet 108 passes by, the following table of positive sensor readings would be derived.

TABLE 8

Table of positive sensor readings over time

| | S1 | S2 | S3 | S1' | S2' | S3' |
|---|---|---|---|---|---|---|
| T0 | | | | | | |
| T1 | | | X | | | |
| T2 | | | X | | | |
| T3 | | | X | | | |
| T4 | | | X | | | |
| T5 | | | X | | | |
| T6 | | | X | | | |
| T7 | | | X | | X | |
| T8 | | | X | | X | |
| T9 | | | | | X | |
| T10 | | | | | X | |
| T11 | | | | | X | |
| T12 | X | | | | | |
| T13 | X | | | | | |
| T14 | X | | | | | |
| T15 | X | | | | | X |
| T16 | X | | | | | X |
| T17 | X | | | | | X |
| T18 | X | | | | | X |
| T19 | | | | | | |

What Table 8 shows are the positive sensor readings for all six sensors 112 through the path as illustrated by the dashed arrow in FIG. 21. The distance between the sensors 112 is known, however, this magnet charts four chords across the sensor vertex. The question is asked whether the relationship between midpoints of the chords and the centers of the circles can be extrapolated.

Figure 22:
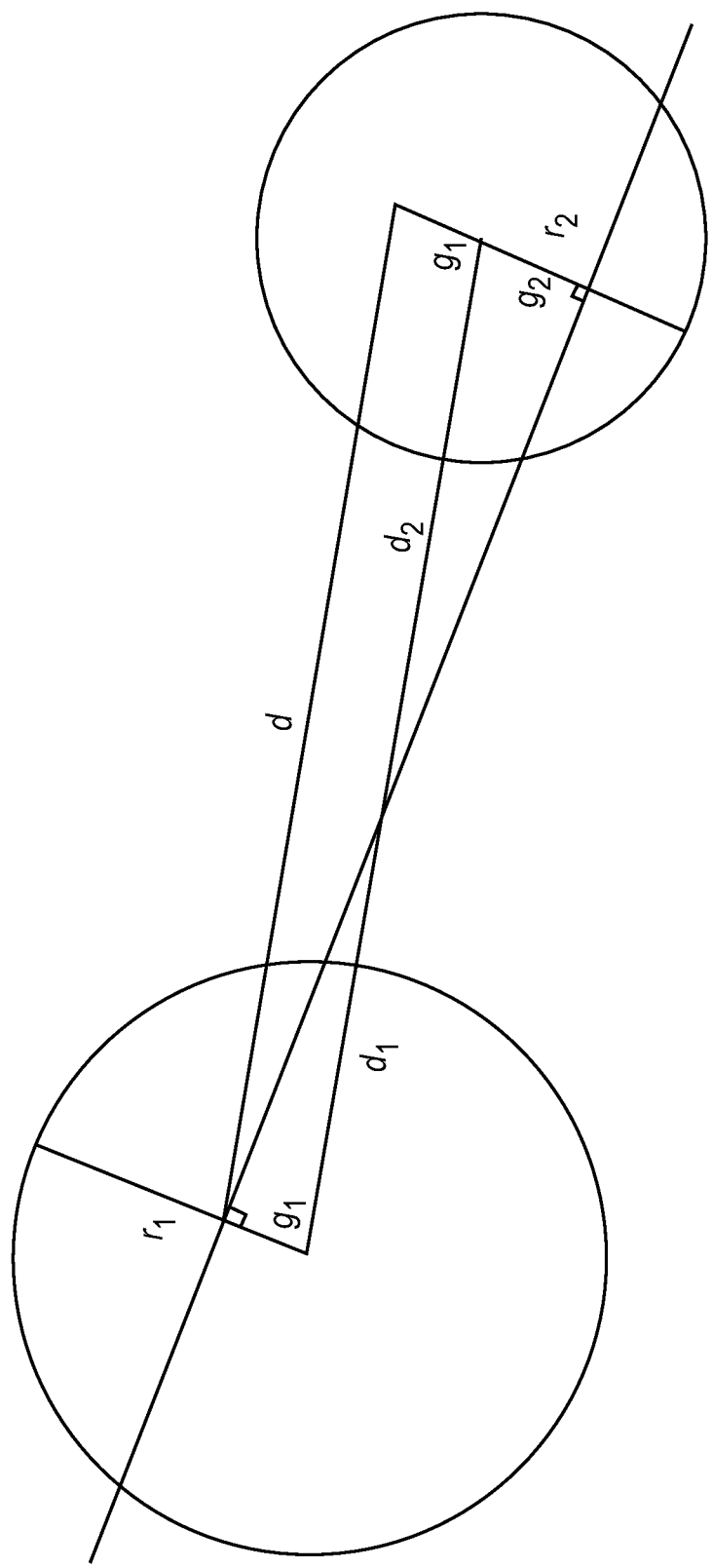
FIG. 22 illustrates an example with two circles of radius $r_1$ and $r_2$ whose centers are d units apart.

An arbitrary example starts with two circles of radius $r_1$ and $r_2$ whose centers are d units apart (see FIG. 22). One line that passes through each circle such that a chord is formed in each (That is, the line intersects each circle at exactly two points).

It is known from standard geometry that the radius r that is perpendicular to the chord 2c also bisects the chord (producing c). It is also known from geometry that the equation of the height h of the chord is given as $$H = r - \sqrt{r^2 - c^2}$$

If h+g=r, then g=r−h and therefore $$g = \sqrt{r^2 - c^2}$$

In the above example d1+d2=d. If a line parallel to the line segment intersecting the centers is extended up until one endpoint meets the midpoint of one of the chords, a right triangle that has a hypotenuse of d, and a height of g1+g2 is created. The distance m between the chord midpoints is as follows.

$$m^2 = d^2 - (g_1 + g_2)^2 = d^2 - (\sqrt{r_1^2 - c_1^2} + \sqrt{r_2^2 - c_2^2})^2$$

As will be the case, c is known in terms of timing only. It is known how much time was spent going from $c_1$ and $c_2$ and the intervening time between. In the case of the sensor fields of view, all r's are the same but the c's are not.

Performing a Maneuver

The following applies some of the information derived above in a practical example.

The example starts with a vehicle free floating in space. It has a known coordinate axis originating at the vehicle's center of mass O and is expressed in terms of orthonormal unit vectors i, j, k in which positive j points at the vehicle's front and positive k points at its top. Positive i, therefore, points at the vehicle's right side.

The vehicle also has a known attitude expressed in terms of a quaternion $Q_0$ representing the rotation of the coordinate axis from some external root attitude (i.e., Earth center, Sun Point, etc.). This quaternion is given as follows.

$$Q_0 = (w_0, x_0, y_0, z_0)$$

The magnitude of the vector part of this quaternion $\|V_0\|$ is given by $$\|V_0\|=\sqrt{x_0^2+y_0^2+z_0^2}$$

Then the axis $A_0$ and angle $\omega_0$ of these values is given by the following.

$$A_0 = \left(\frac{x_0}{\|V_0\|}, \frac{y_0}{\|V_0\|}, \frac{z_0}{\|V_0\|}\right)$$

$$\omega_0 = 2\cos^{-1}(w_0)$$

Next the new desired attitude of the vehicle is defined as another Quaternion $Q_1$. This quaternion represents the new attitude of the spacecraft in the same coordinate space as $Q_0$.

$$Q_1 = (w_1, x_1, y_1, z_1)$$

$$\|V_1\| = \sqrt{x_1^2 + y_1^2 + z_1^2}$$

$$A_1 = \left(\frac{x_1}{\|V_1\|}, \frac{y_1}{\|V_1\|}, \frac{z_1}{\|V_1\|}\right)$$

$$\omega_1 = 2\cos^{-1}(w_1)$$

The example next determines is the error quaternion $Q_e$. The Error quaternion is the quaternion rotation that would produce the new desired attitude $Q_1$ from the current known attitude $Q_0$. Given this the following relationship applies.

$$Q_0 Q_e = Q_1$$

To solve this equation for $Q_e$ the solution must multiply by the inverse of $Q_0$.

$$Q_e = \frac{Q_1}{Q_0}$$
$$= (Q_0)^{-1} Q_1$$

The inverse of a quaternion is defined, in terms of its components as follows.

$$(Q_0)^{-1} = \left(\frac{w_0}{\|Q_0\|^2}, \frac{-x_0}{\|Q_0\|^2}, \frac{-y_0}{\|Q_0\|^2}, \frac{-z_0}{\|Q_0\|^2}\right)$$

The magnitude of the Quaternion $\|Q_0\|$ is defined as follows $$\|Q_0\|=\sqrt{w_0^2+x_0^2+y_0^2+z_0^2},$$

using the rules of quaternion multiplication to multiply the two quaternions together.

It is known how to calculate the error quaternion between two rotational attitudes. This is the rotation in the external coordinate frame applied to the current attitude $Q_0$ in order to produce the new desired rotation $Q_1$.

On this vehicle, the example assumes that an embodiment of the spherical motor 100 has been mounted to the vehicle. There will be a constant unit Quaternion $Q_r$ that represents the rotation of the spherical motor 100 coordinate axis relative to the coordinate axis of the vehicle. Ideally, this quaternion would represent a zero rotation (−1, 1, 1, 1), meaning that the spherical motor 100 is oriented with its coordinate axis in the same direction as the vehicle's coordinate axis. However, if this is not the case, then $$Q_r = (w_r, x_r, y_r, z_r)$$

$$\|Q_r\|=\sqrt{w_r^2+x_r^2+y_r^2+z_r^2}=1$$

Because it is a unit quaternion, its inverse is the same as its conjugate $$(Q_r)^{-1} = (Q_r)^* = (w_r, -x_r, -y_r, -z_r)$$

The error quaternion is rotated into the coordinate space of the spherical motor 100. To do this, the inverse of the spherical motor 100 quaternion $(Q_r)^{-1}$ is applied to the error quaternion $Q_e$. The result $Q_c$, derived using quaternion multiplication as described above, is the quaternion that describes the desired rotation applied to the spherical motor 100 in the spherical motor 100 coordinate system.

$$Q_c = Q_e (Q_r)^{-1} = (w_c, x_c, y_c, z_c)$$

The magnitude of the vector part is given as $$\|V_c\|=\sqrt{x_c+y_c+z_c}.$$

The axis of this quaternion is given as $$A_c = \left(\frac{x_c}{\|V_c\|}, \frac{y_c}{\|V_c\|}, \frac{z_c}{\|V_c\|}\right).$$

The angle $\theta$ is given by $$\theta = 2\cos^{-1}(w_c).$$

These values represent the Control Axis on which to perform the rotation and the angle to rotate through.

The maneuver is a three part process. First, impart a rotational momentum to the vehicle. Next, wait a period of time while the vehicle rotates through the desired angle. Finally, reverse the rotational momentum.

If it assumed that S seconds will be spent performing the maneuver, then must $\theta$ radians are traversed in S seconds. This produces the desired angular velocity of $$\omega = \frac{\theta}{S}$$

Now all the values needed to command the reaction sphere to perform this maneuver are present.
1. The vehicle time ($t_0$) is marked
2. Command the reaction sphere to ($\omega$, $A_c$).
3. If vehicle time reaches $t_2 = S/2$ then go to step 8.
4. Otherwise monitor the reaction sphere telemetry until the command count is zero for all vertices
5. Mark the new vehicle time ($t_1$)
6. Compute delta time as ($t_1 - t_0$).
7. Wait until vehicle time $t_2 = S - 2(t_1 - t_0)$
8. Command the reaction sphere to ($-\omega$, $-A_c$).

Although the embodiments described throughout this disclosure utilize a spherical motor system for three-axis control and stabilization of satellites, the spherical motor system may alternatively provide three-axis control and stabilization of other vehicles such as ground (e.g., cars, trucks, tanks, etc.), water (e.g., ships, submarines, etc.), or air (e.g., airplanes, helicopters, etc.) vehicles.

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

The invention claimed is:

1. A spherical motor system for control and stabilization of a vehicle in three orthogonal axes, the system comprising:
    a spherical rotor having permanent magnets positioned in evenly-spaced antipodal pairs, wherein each of the permanent magnets are oriented with the same magnetic pole facing outward from a center of the rotor;
    a stator having electromagnets positioned in evenly-spaced antipodal pairs that spatially correspond with the permanent magnets, the stator further having magnetic sensors surrounding at least one of each electromagnet antipodal pair to detect one of the permanent magnets; and
    a control system that controls timing and duration of energization of the electromagnets based on the detection of the one of the permanent magnets with the sensors to provide the electromagnets with the opposite magnetic pole of the permanent magnets in order to attract the permanent magnets whereby momentum is transferred between the rotor and the stator along a controlled vector.

2. The spherical motor system of claim 1, wherein the sensors are positioned along the stator such that they detect the permanent magnets only on one hemisphere of the rotor at any time.

3. The spherical motor system of claim 1, wherein the rotor comprises non-magnetic material between the permanent magnets.

4. The spherical motor system of claim 3, wherein the non-magnetic material is selected from the group consisting of plastic, aluminum, 300-series stainless steel, tungsten, and combinations thereof.

5. The spherical motor system of claim 1, wherein the at least one electromagnet is centrally positioned within a ring of the sensors.

6. The spherical motor system of claim 1, wherein the sensors are hall effect sensors.

7. The spherical motor system of claim 1, wherein the stator includes a hollow spherical shell surrounding the rotor.

8. The spherical motor system of claim 7, wherein the hollow spherical shell comprises a diamagnetic material.

9. The spherical motor system of claim 1, wherein the vehicle is a satellite, and wherein the stator is connected to the satellite.

10. A method for controlling and stabilizing a vehicle in three orthogonal axes, the method comprising:
    positioning permanent magnets along a spherical rotor in evenly-spaced antipodal pairs, wherein each of the permanent magnets are oriented with the same magnetic pole facing outward from a center of the rotor;
    positioning electromagnets along a stator in evenly-spaced antipodal pairs that spatially correspond with the permanent magnets;
    positioning magnetic sensors along the stator that surround at least one of each electromagnet antipodal pair:
    detecting one of the permanent magnets with the sensors; and
    controlling, with a control system, timing and duration of energization of the electromagnets based on the detecting of the one of the permanent magnets with the sensors to provide the electromagnets with the opposite magnetic pole of the permanent magnets in order to attract the permanent magnets whereby momentum is transferred between the rotor and the stator along a controlled vector.

11. The method of claim 10, wherein the sensors are positioned along the stator such that they detect the permanent magnets only on one hemisphere of the rotor at any time.

12. The spherical motor system of claim 10, wherein the rotor comprises non-magnetic material between the permanent magnets.

13. The method of claim 12, wherein the non-magnetic material is selected from the group consisting of plastic, aluminum, 300-series stainless steel, tungsten, and combinations thereof.

14. The method of claim 11, wherein the at least one electromagnet is centrally positioned within a ring of the sensors.

15. The method of claim 10, wherein the sensors are hall effect sensors.

16. The method of claim 10, wherein the stator includes a hollow spherical shell surrounding the rotor.

17. The method of claim 16, wherein the hollow spherical shell comprises a diamagnetic material.

18. The method of claim 10, wherein the vehicle is a satellite, and wherein the stator is connected to the satellite.

* * * * *